(12) United States Patent
Maruoka

(10) Patent No.: US 8,355,953 B2
(45) Date of Patent: Jan. 15, 2013

(54) REQUIREMENT MANAGEMENT DEVICE, REQUIREMENT MANAGEMENT METHOD, COMPUTER PRODUCT

(75) Inventor: Osamu Maruoka, Kawasaki (JP)

(73) Assignee: Fujitsu Semiconductor Limited, Yokohama-Shi (JP)

( * ) Notice: Subject to any disclaimer, the term of this patent is extended or adjusted under 35 U.S.C. 154(b) by 2163 days.

(21) Appl. No.: 11/094,640

(22) Filed: Mar. 31, 2005

(65) Prior Publication Data

US 2006/0100936 A1 May 11, 2006

(30) Foreign Application Priority Data

Nov. 5, 2004 (JP) ................................. 2004-322042

(51) Int. Cl.
*G06Q 30/00* (2012.01)
*G06F 19/00* (2011.01)
(52) U.S. Cl. .......................... 705/26.1; 700/95
(58) Field of Classification Search .................. None
See application file for complete search history.

(56) References Cited

U.S. PATENT DOCUMENTS

| | | | | |
|---|---|---|---|---|
| 6,801,826 | B2* | 10/2004 | Tanabe | 700/121 |
| 7,039,481 | B2* | 5/2006 | Kawase et al. | 700/99 |
| 7,266,763 | B2* | 9/2007 | Peyton-Jones et al. | 715/213 |
| 2004/0186765 | A1 | 9/2004 | Kataoka | |

FOREIGN PATENT DOCUMENTS

| | | |
|---|---|---|
| JP | 11-000838 | 1/1999 |
| JP | 2002-063440 | 2/2002 |
| JP | 2003-044550 | 2/2003 |
| JP | 2004-139472 | 5/2004 |
| WO | 03/081492 A1 | 10/2003 |

OTHER PUBLICATIONS

NPL_Spreadsheet_Smarts, Stein, Justin D., Journal of Accountacy, Jan. 2000, 5 pages downloaded from http:/www.journalofaccountancy.com/Issues/2000/Jan/SpreadsheetsSmarts.htm?action=print on Sep. 2, 2009.*
Hori, Takaaki, "Work Support Tool Series, (Part 1), Instruments", vol. 46, No. 4, Instrumentation Control Engineering, Japan, Kogyogijutsusha, (LLC), Mar. 1, 2003, pp. 68-71.
Japanese Office Action issued Mar. 5, 2010 in corresponding Japanese Patent Application 2004-322042.

* cited by examiner

*Primary Examiner* — Paul Danneman
(74) *Attorney, Agent, or Firm* — Staas & Halsey LLP

(57) ABSTRACT

When ordering manufacture of a product, an input is received of request information including at least information on desired delivery date for the product, information on desired quantity of the product, and information on which step the product is fabricated to (requirement rank information), and all or part of the request information accepted is displayed on a display screen.

19 Claims, 32 Drawing Sheets

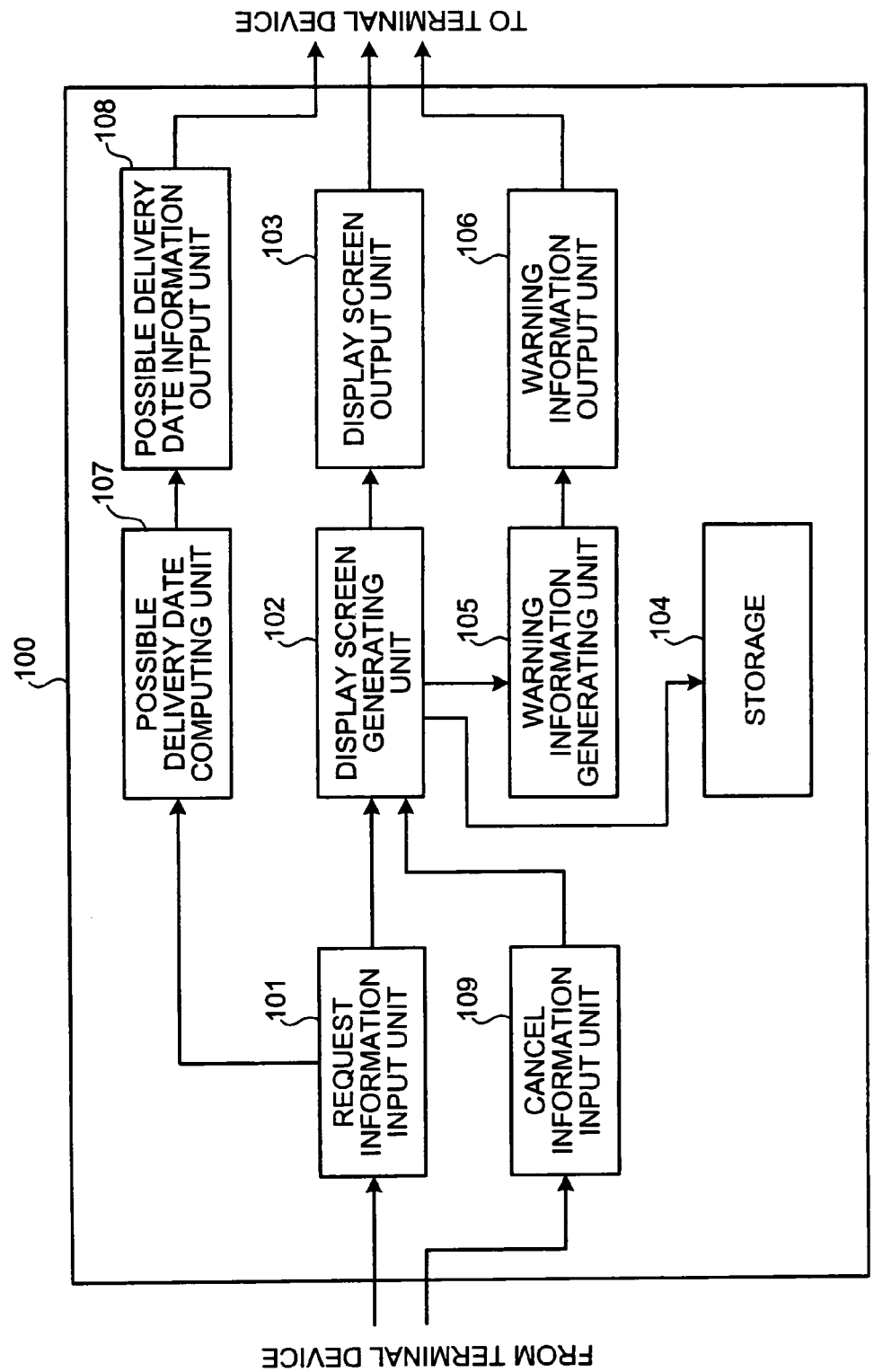

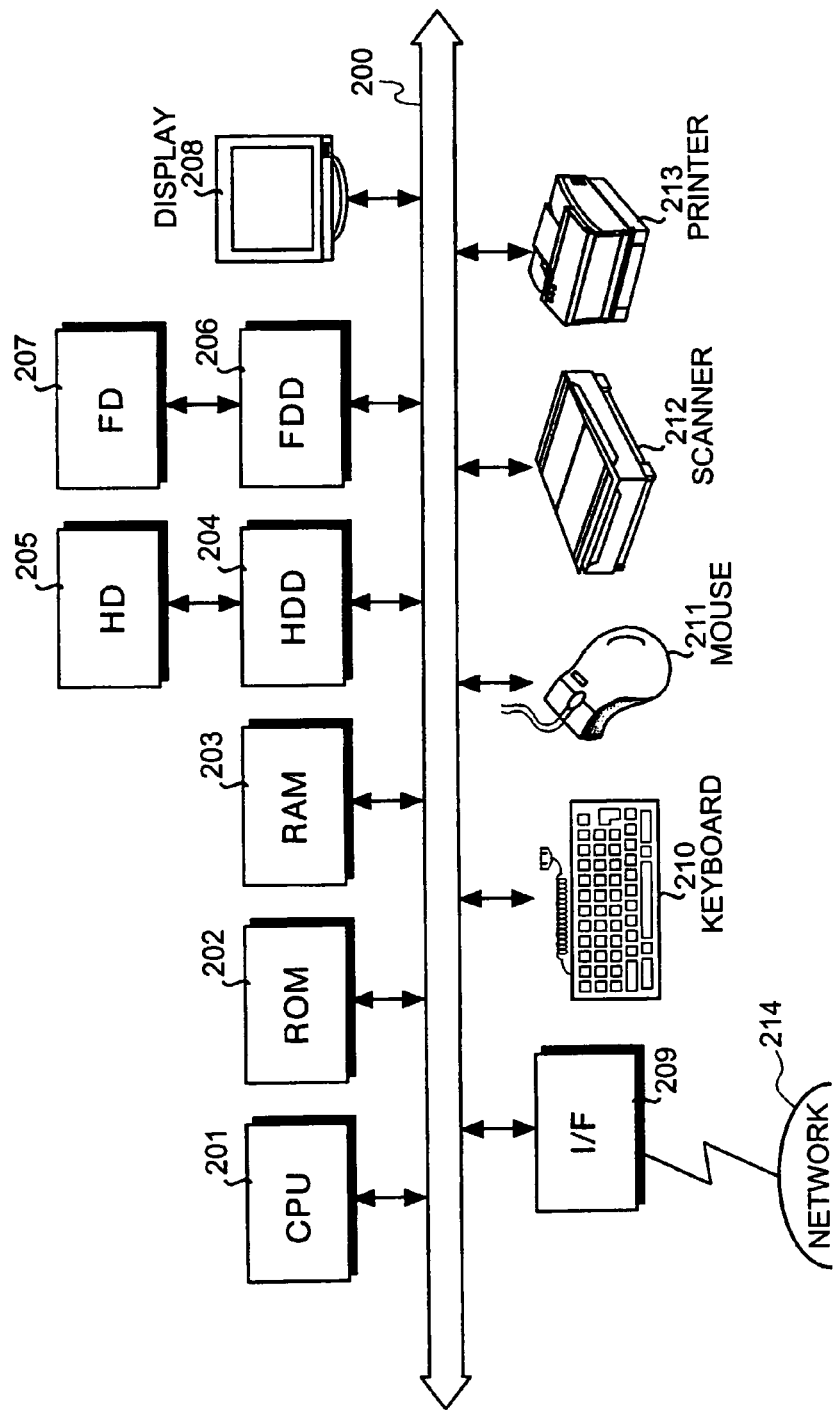

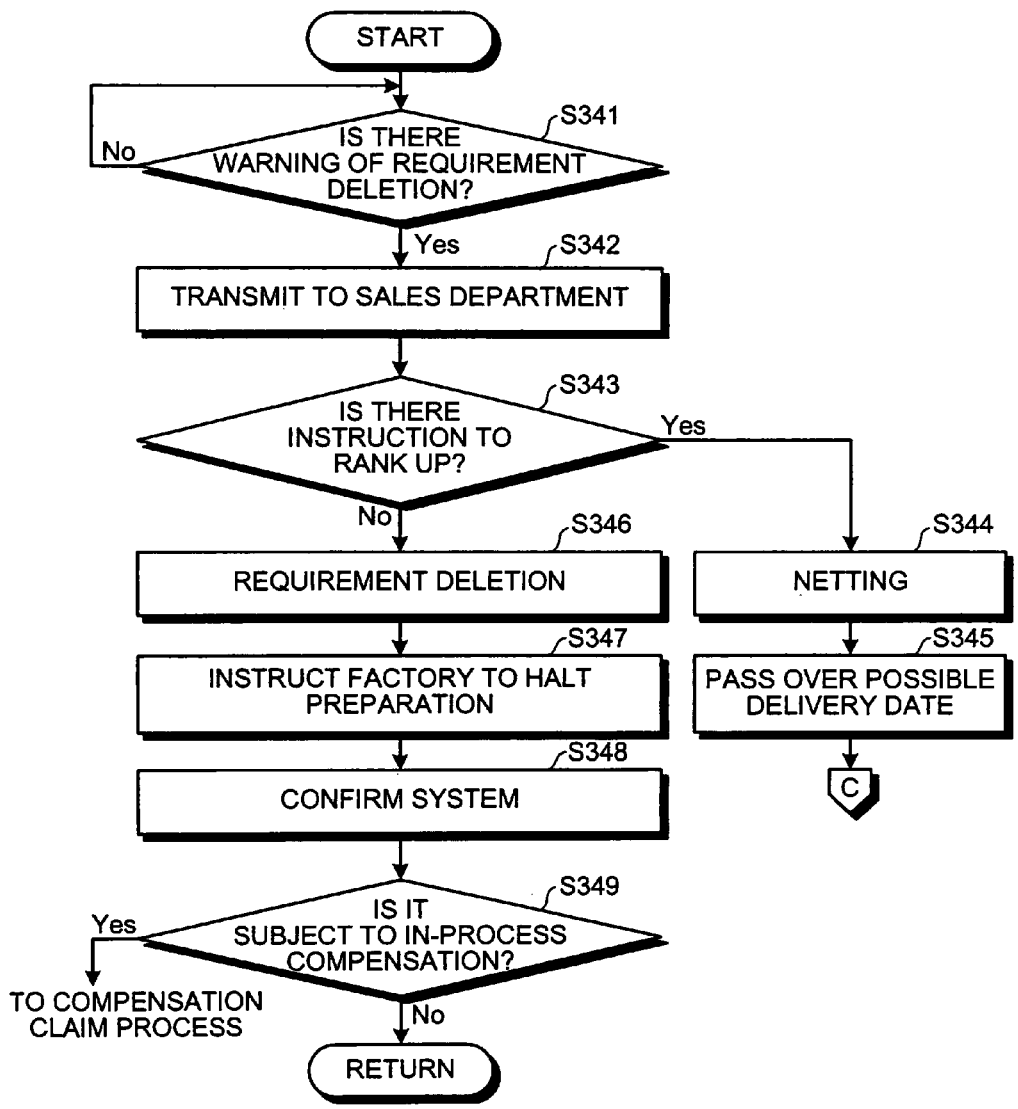

FIG.5

| REQUIREMENT RANK | CATEGORY | FINANCIAL POINT | TIME LIMIT | IN-PROCESS COMPENSATION |
|---|---|---|---|---|
| ORDER | ALL | FABRICATE UP TO FINISHED PRODUCT | NONE | YES |
| RANK A | FULL CUSTOM | FABRICATE UP TO CHIP | 2W (ASSEMBLY TO FINAL TEST) | YES |
| | SEMI-CUSTOM | | | |
| RANK *B | FULL CUSTOM | FABRICATE UP TO BULK | 5W (WIRING TO FINAL TEST) | YES |
| RANK B | FULL CUSTOM | — | 7W (DIFFUSION TO FINAL TEST) | NO |
| | SEMI-CUSTOM | FABRICATE UP TO BULK | 5W (WIRING TO FINAL TEST) | NO |

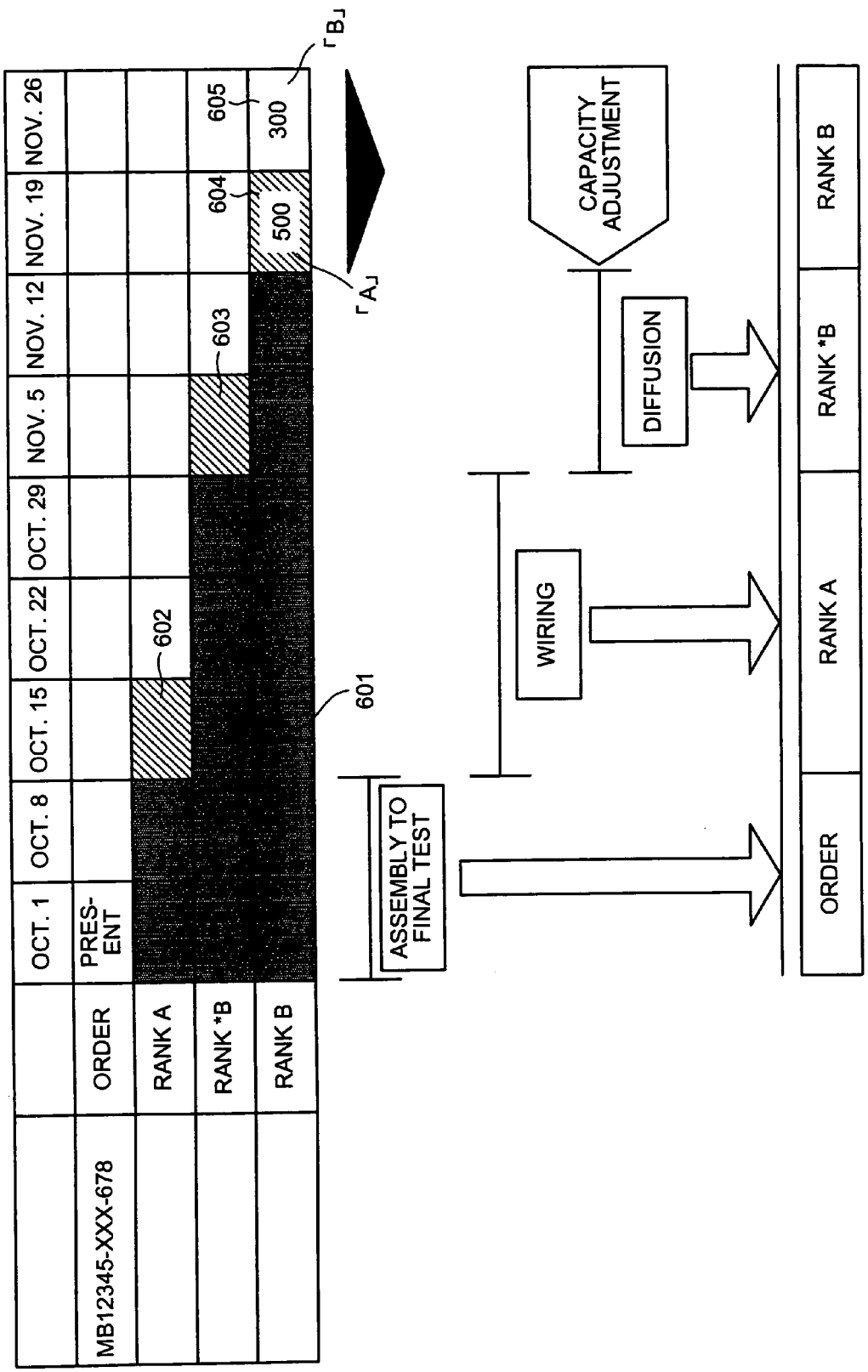

FIG.6B

| DESIRED DELIVERY DATE×QUANTITY | POSSIBLE DELIVERY DATE |
|---|---|
| · NOV. 19×500 (RANK B) | NOV. 20 |
| · NOV. 26×300 (RANK B) | NOV. 30 |

*COMMITMENT TO SUPPLY SCHEDULE IN SPITE OF NON-PREPARATION (CAPACITY ADJUSTMENT ONLY) ADJUSTMENT TO SECURE CAPACITY IS CARRIED OUT BASED ON ABOVE QUANTITIES. (ACTUAL PREPARATION IS NOT CARRIED OUT BECAUSE OF RANK B)

FIG.7B

| DESIRED DELIVERY DATE×QUANTITY | POSSIBLE DELIVERY DATE |
|---|---|
| · NOV. 19×500 (RANK *B) | NOV. 20 |
| · NOV. 26×300 (RANK B) | NOV. 30 |
| · DEC. 3×400 (RANK B) | DEC. 3 |

*PREPARATION IS COMMENCED IN ACTUAL DIFFUSION PROCESS DUE TO ORDER FOR 500 PIECES OF WEEK OF NOV. 19 IS RANKED UP (TO *B RANK).
POSSIBLE DELIVERY DATE IS PASSED OVER AT SAME TIME.

FIG.8A

| MB12345-XXX-678 | | OCT. 1 | OCT. 8 | OCT. 15 | OCT. 22 | OCT. 29 | NOV. 5 | NOV. 12 | NOV. 19 | NOV. 26 | DEC. 3 |
|---|---|---|---|---|---|---|---|---|---|---|---|
| | ORDER | | | PRES-ENT | | | | | | | |
| | RANK A | | | | | | | | | | |
| | RANK *B | | | | | | | | | 500 (801) | 300 (802) | 803 |
| | RANK B | | | | | | | | | | | 400 |

PREPARATION INSTRUCTION FOR DIFFUSION PROCESS

FIG.8B

| DESIRED DELIVERY DATE×QUANTITY | POSSIBLE DELIVERY DATE |
|---|---|
| · NOV. 19×500 (RANK *B) | NOV. 20 |
| · NOV. 26×300 (RANK *B) | NOV. 30 |
| · DEC. 3×400 (RANK B) | DEC. 3 |

*PREPARATION IS COMMENCED IN ACTUAL DIFFUSION PROCESS DUE TO ORDER FOR 300 PIECES OF WEEK OF NOV. 26 IS RANKED UP (TO *B RANK).
POSSIBLE DELIVERY DATE IS PASSED OVER AT SAME TIME.

FIG.9A

| MB12345-XXX-678 | OCT. 22 | OCT. 29 | NOV. 5 | NOV. 12 | NOV. 19 | NOV. 26 | DEC. 3 | DEC. 10 | DEC. 17 | DEC. 24 |
|---|---|---|---|---|---|---|---|---|---|---|
| ORDER | PRES-ENT | | | | | | | | | |
| RANK A | | | | | | 901 | | | | |
| RANK *B | | | | | (500) | | 902 300 | | | |
| RANK B | | | | | | | | (400) 903 | | |

PREPARATION INSTRUCTION FOR WIRING PROCESS

PREPARATION INSTRUCTION FOR ADDITIONAL DIFFUSION PROCESS

FIG.9B

| DESIRED DELIVERY DATE×QUANTITY | POSSIBLE DELIVERY DATE |
|---|---|
| · NOV. 19×500 (RANK A) | NOV. 20 |
| · NOV. 26×300 (RANK *B) | NOV. 30 |
| · DEC. 3×400 (RANK *B) | DEC. 3 |

*FOR ORDERS FOR 500 PIECES ON WEEK OF NOV. 19 AND 400 PIECES ON WEEK OF DEC. 3, PREVIOUS POSSIBLE DELIVERY DATES ARE PASSED OVER, AND PREPARATIONS FOR WIRING PROCESS AND DIFFUSION ARE CARRIED OUT, RESPECTIVELY.

FIG.10B

| DESIRED DELIVERY DATE×QUANTITY | POSSIBLE DELIVERY DATE |
|---|---|
| · NOV. 19×500 (RANK A) | NOV. 20 |
| · NOV. 26×300 (RANK *B) | NOV. 30 |
| · DEC. 3×400 (RANK *B) | DEC. 3 |

FIG.11A

| MB12345-XXX-678 | | ORDER | DELE-TION | OCT. 1 | OCT. 8 | OCT. 15 | OCT. 22 | OCT. 29 | NOV. 5 | NOV. 12 | NOV. 19 | NOV. 26 |
|---|---|---|---|---|---|---|---|---|---|---|---|---|
| | SUBJECT TO IN-PROCESS COMPENSATION | RANK A | | | PRES-ENT | | | | | | | |
| | | RANK *B | | | | | | | | | | |
| | | RANK B | | | | | | | | | | 300 |

FIG.11B

| DESIRED DELIVERY DATE×QUANTITY | POSSIBLE DELIVERY DATE |
|---|---|
| ~~NOV. 19×500~~ | ~~NOV. 20~~ |
| · NOV. 26×300 | NOV. 30 |

*COMMITMENT TO SUPPLY SCHEDULE IN
SPITE OF NON-PREPARATION (CAPACITY ADJUSTMENT ONLY)
*DELETED REQUIREMENT DOES NOT BECOME
SUBJECT TO IN-PROCESS COMPENSATION DUE TO RANK B.

FIG.14C

| REQUIREMENT | RANK | QUANTITY | DESIRED DELIVERY DATE | POSSIBLE DELIVERY DATE |
|---|---|---|---|---|
| "I" | A | 500 | 10/1 | 10/5 |
| "J" | A | 500 | 11/1 | 10/7 |
| "K" | A | 200 | 12/1 | 12/3 |
| "L" | B | 300 | 12/3 | 12/5 |
| "M" | B | 500 | 1/1 | 1/5 |
| "N" | B | 500 | 2/1 | 2/10 |
| "O" | B | 500 | 3/1 | 3/3 |

FIG.14D

| REQUIREMENT | RANK | QUANTITY | DESIRED DELIVERY DATE | POSSIBLE DELIVERY DATE |
|---|---|---|---|---|
| "P" | ORDER | 1300 | 10/1 | |
| | | AVAILABLE 500 | | 10/5 |
| | | AVAILABLE 500 | | 11/7 |
| | | AVAILABLE 200 | | 12/1 |
| | | AVAILABLE 100 | | 12/5 |
| "L" | B | 200 | 12/3 | 12/5 |
| "M" | B | 500 | 1/1 | 1/5 |
| "N" | B | 500 | 2/1 | 2/10 |
| "O" | B | 500 | 3/1 | 3/3 |

FIG.14E

| REQUIREMENT | RANK | QUANTITY | DESIRED DELIVERY DATE | POSSIBLE DELIVERY DATE |
|---|---|---|---|---|
| "P" | ORDER | 1300 | 10/1 | |
| | | AVAILABLE 500 | | 10/5 |
| | | AVAILABLE 500 | | 10/15 ← |
| | | AVAILABLE 200 | | 10/20 ← |
| | | AVAILABLE 100 | | 10/20 ← |
| "L" | B | 200 | 12/3 | 12/5 |
| "M" | B | 500 | 1/1 | 1/5 |
| "N" | B | 500 | 2/1 | 2/10 |
| "O" | B | 500 | 3/1 | 3/3 |

FIG.16B

| RANK | FINAL INPUT | REQUIRED DATE | DELETION DATE | QUANTITY | AUTOMA-TION |
|---|---|---|---|---|---|
| A | 12/20 | 1/20 | 1/15 | -1000 | |
| A | 11/20 | 1/27 | 1/15 | -2000 | |
| A | 11/20 | 2/3 | 1/15 | -2000 | |

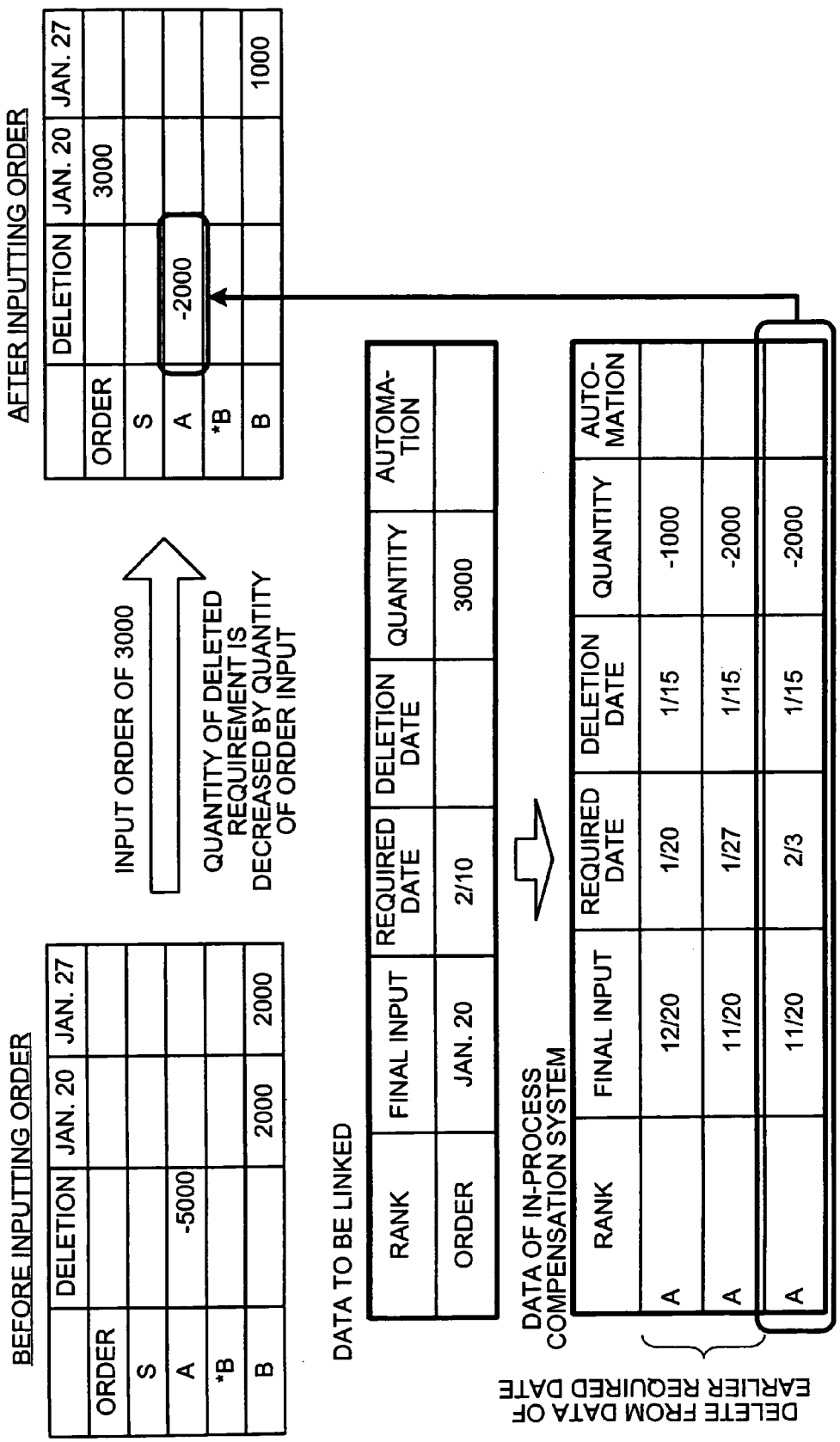

FIG.18

| MBxxx 00001 | | DROPPED | M1 | | | | | | M2 | | | | | | M3 | | | | | | M4 | | | | | | M5-M14 | | |
|---|---|---|---|---|---|---|---|---|---|---|---|---|---|---|---|---|---|---|---|---|---|---|---|---|---|---|---|---|---|
| | ORDER | DP | | W1 | W2 | W3 | W4 | W5 | | W1 | W2 | W3 | W4 | W5 | | W1 | W2 | W3 | W4 | W5 | | W1 | W2 | W3 | W4 | W5 | M5 | M6 | M7 |
| | A | 10 | 100 | 20 | 20 | 20 | 20 | 20 | 40 | 20 | 20 | 0 | 0 | 0 | 0 | 0 | 0 | 0 | 0 | 0 | 0 | 0 | 0 | 0 | 0 | 0 | 0 | 0 | 0 |
| | B* | 100 | 100 | | | | | | 140 | | | | | 140 | 100 | 20 | 20 | 20 | 40 | 180 | 0 | 0 | 0 | 0 | 0 | 0 | 0 | 0 | 0 |
| | B | 50 | 50 | | | | | | | | | | | | 180 | | | | | | 0 | 0 | 0 | 0 | 0 | 0 | 0 | 0 | 0 |
| | | 0 | 0 | | | | | | | | | | | | | | | | | | 750 | 0 | 150 | 0 | 0 | 0 | 450 | 50 | 50 | 50 |
| | SS | | | 150 | 20 | 20 | 20 | 20 | 20 | 210 | 20 | 10 | 30 | 10 | 140 | 280 | 100 | 0 | 0 | 0 | 80 | 750 | 0 | 150 | 200 | 200 | 200 | 450 | 0 | 0 | 0 |

REQUIREMENT MANAGEMENT DEVICE, REQUIREMENT MANAGEMENT METHOD, COMPUTER PRODUCT

CROSS-REFERENCE TO RELATED APPLICATIONS

This application is based upon and claims the benefit of priority from the prior Japanese Patent Application No. 2004-322042, filed on Nov. 5, 2004, the entire contents of which are incorporated herein by reference.

BACKGROUND OF THE INVENTION

1) Field of the Invention

The present invention relates to a technology for requirement management.

2) Description of the Related Art

In a conventional manufacturing and sales management system, a technology in which a sales department system transmits automatically order entry information ranked as a forecast order entry, a preliminary order entry, and a final order entry, input order information, and sales stock information with respect to each sales item to a production management system of a factory, the factory computes a production plan automatically and transmits automatically a reply of factory shipment to the system of the sales department, and the sales department system automatically allocates delivery dates with respect to each piece of order entry information and replies to a client on a delivery date is disclosed (for example, Japanese Patent Application Laid-Open Publication No. 2003-44550).

In the conventional technology, however, there has been a problem that a detailed instruction of production cannot be provided to the factory based on requirement information. In addition to this, there has been another problem that when the contents of the requirement information are changed, it is impossible to provide timely and automatically an instruction to the factory corresponding to the change.

SUMMARY OF THE INVENTION

It is an object of the present invention to at least solve the problems in the conventional technology.

According to an aspect of the present invention, a requirement management device includes a request information input unit that accepts an input of request information, at the time of making a request of manufacturing a product, the request information including at least information on desired delivery date for the product, information on desired quantity of the product, and requirement rank information that is information on which step the product is manufactured to; a display screen generating unit that generates information on display screen on which a list of all or part of the request information input by the request information input unit is displayed; and an outputting unit that outputs the information on display screen generated by the display screen generating unit.

According to another aspect of the present invention, a requirement management method includes accepting an input of request information, at the time of making a request of manufacturing a product, the request information including at least information on desired delivery date for the product, information on desired quantity of the product, and requirement rank information that is information on which step the product is manufactured to; displaying a list of all or part of the request information accepted at the accepting is displayed.

According to still another aspect of the present invention, a computer-readable recording medium stores therein a computer program that causes a computer to execute the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a functional block diagram of a requirement management device according to an embodiment of the present invention;

FIG. 2 is a block diagram of a hardware structure of the requirement management device shown in FIG. 1;

FIGS. 3A to 3E are flowcharts of process procedures performed by the requirement management device shown in FIG. 1;

FIG. 5 is a detailed diagram to explain a list of requirement ranks according to the present example of the invention;

FIG. 6A is a detailed diagram to explain a liaison between an operational flow of a full custom product and a requirement management system (part 1);

FIG. 6B is a detailed diagram to explain a status of holding the possible delivery dates shown in FIG. 6A;

FIG. 7B is a detailed diagram to explain a status of holding the possible delivery dates shown in FIG. 7A;

FIG. 8A is a detailed diagram to explain a liaison between an operational flow of a full custom product and a requirement management system (part 3);

FIG. 8B is a detailed diagram to explain a status of holding the possible delivery dates shown in FIG. 8A;

FIG. 9A is a detailed diagram to explain a liaison between an operational flow of a full custom product and a requirement management system (part 4);

FIG. 9B is a detailed diagram to explain a status of holding the possible delivery dates shown in FIG. 9A;

FIG. 10B is a detailed diagram to explain a status of holding the possible delivery dates shown in FIG. 10A;

FIG. 11A is a detailed diagram to explain a liaison between an operational flow of a full custom product and a requirement management system (part 6);

FIG. 11B is a detailed diagram to explain a status of holding the possible delivery dates shown in FIG. 11A;

FIG. 14C is a chart to explain a status of holding possible delivery dates shown in FIG. 14A;

FIG. 14D is a detailed diagram to explain a status of holding the possible delivery dates shown in FIG. 14D (part 1);

FIG. 14E is a detailed diagram to explain a status of holding the possible delivery dates shown in FIG. 14E (part 2);

FIG. 16B is a detailed diagram to explain contents of detailed data that should be in liaison with the in-process compensation system shown in FIG. 16A;

FIG. 17 is a detailed diagram to explain contents of decreases of deleted requirements; and FIG. 18 is a detailed diagram to explain one example of a display screen.

DETAILED DESCRIPTION

Figure 3A:
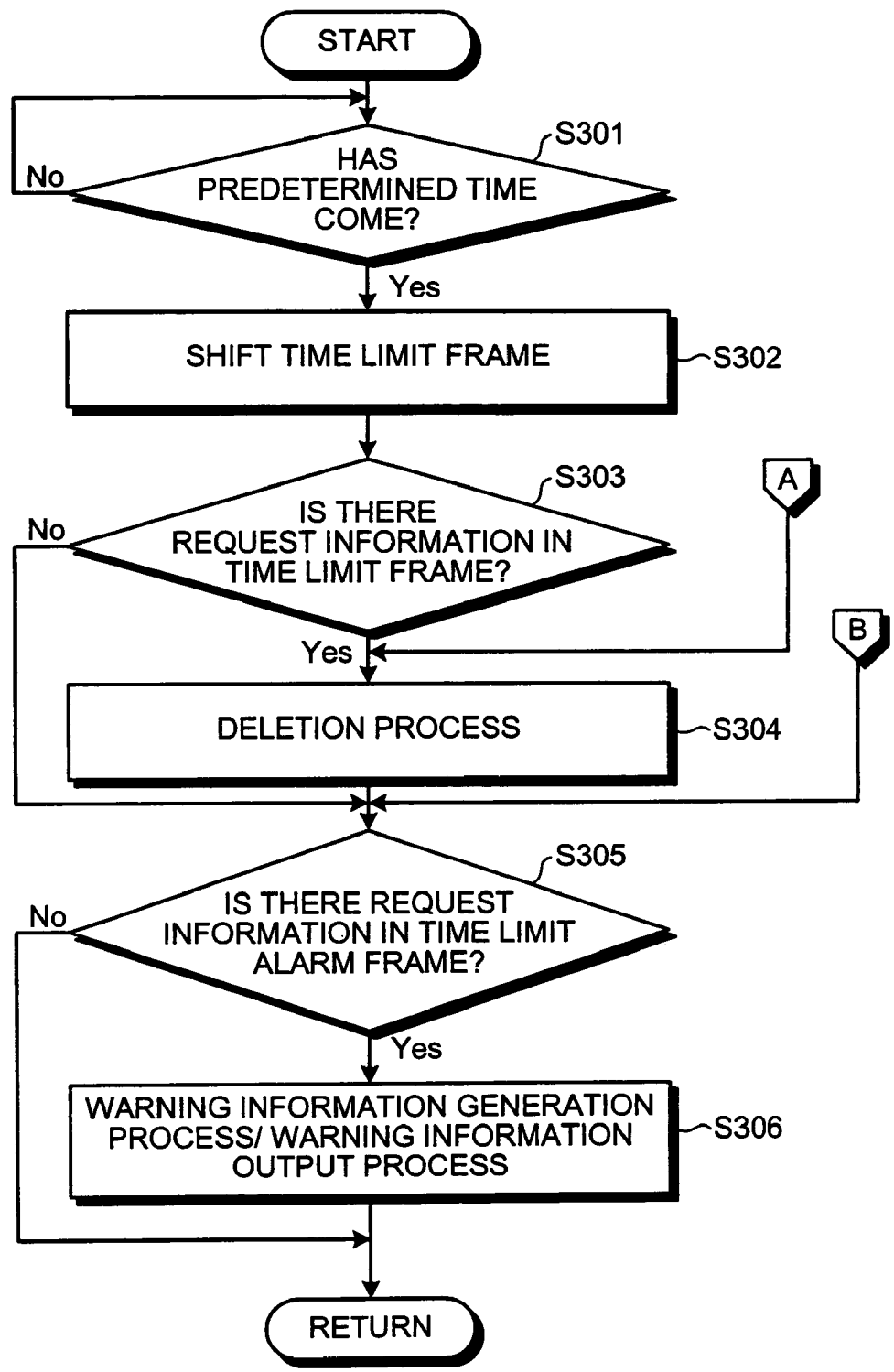

Exemplary embodiments of the present invention will be explained in detail with reference to the accompanying drawings.

FIG. 1 is a block diagram representing a functional structure of the requirement management device according to the present embodiment of this invention. In FIG. 1, a requirement management device 100 is constructed including a request information input unit 101, a display screen generating unit 102, a display screen output unit 103, a storage 104, a warning information generating unit 105, a warning information output unit 106, a possible delivery date computing unit 107, a possible delivery date information output unit 108, and a cancel information input unit 109.

The request information input unit 101 accepts an input of request information when a request to manufacture a product is made. The request information includes at least information on a desired delivery date of a product that is requested to be manufactured, information on a desired quantity of the product, and requirement rank information. The requirement rank information is information on which process the product is fabricated to. The details of the requirement rank information will be explained later (for example, refer to FIG. 5). The requirement management device inhibits an input of request information at the time of a predetermined desired delivery date set for every requirement rank information. Further, the requirement management device deletes automatically input request information when the request information input by the request information input unit 101 reaches the time of the predetermined desired delivery date without change of the requirement rank information.

The display screen generating unit 102 generates information on display screen. The information on display screen is information on contents, which are listed for display, of all or part of the request information input by the request information input unit 101. The display screen displays information on desired delivery dates in time series as well as the information on desired delivery dates and the requirement rank information in a matrix display, that is, for example, the information on desired delivery date is placed on the horizontal axis and the requirement rank information is placed on the vertical axis. The information on quantity is input to a corresponding position on the matrix display, thereby displaying the input information on quantity at the corresponding position. Details of contents of the display screen are explained later (for example, refer to FIG. 18).

The display screen output unit 103 outputs the information on display screen generated by the display screen generating unit 102 to, for example, a terminal device of a client who requests production or a broker not shown. Further, the display screen output unit 103 may display the information on display screen (display) or output it to a printer to be printed out on recording paper. By displaying information in such a way, it is possible to grasp easily a relation among a desired delivery date, a requirement rank, and a desired quantity of a product.

Furthermore, the display screen generating unit 102 generates information on display screen such that an input of information on quantity to a particular position is inhibited by allowing the particular position to be displayed (for example, colored in red etc.) by a display method different from that for other positions at the predetermined position on the matrix display. The display screen generating unit 102 makes it possible to inform of time when a desired delivery date cannot be input depending on requirement ranks with ease as well as not to allow an input of request information by mistake at the time when the desired delivery date cannot be input depending on the requirement ranks.

Still further, the display screen generating unit 102 moves a position where an input is inhibited in the time series direction at every predetermined time and generates information on display screen such that the request information concerning the information on quantity that has been displayed at the position having been moved is automatically deleted. This makes it possible not only to save labor but also to prevent unnecessary request information from remaining. Still further, the storage 104 stores the information on quantity in the request information deleted automatically for every requirement rank. The request information having been automatically deleted that is stored can be utilized for computation of in-process compensation.

The warning information generating unit 105 generates warning information when information on quantity is displayed at a position that is to be a position where an input is inhibited upon a next move. The warning information output unit 106 outputs the warning information generated by the warning information generating unit 105. Informing that request information is going to be deleted makes it possible to promote ranking up as well as to prevent the request information from being deleted due to forgetting to promote ranking up.

The possible delivery date computing unit 107 computes a possible delivery date for a request based on the request information input by the request information input unit 101. Moreover, when requirement rank information in the request information is changed, the possible delivery date computing unit 107 passes the information on the possible delivery date computed over to the changed request information. Then, the possible delivery date information output unit 108 outputs the above information on the possible delivery date.

Still further, the possible delivery date computing unit 107 not only computes a possible delivery date for a request based on the request information input by the request information input unit 101 but also passes the information on the computed possible delivery date in the request information that has already been input and has a requirement rank other than order over to the request information of the order when "order" in the request information, that is, a rank in which a product is fabricated up to the finished product is input as requirement rank information.

The cancel information input unit 109 accepts an input of cancellation of the request information having already been input by the request information input unit 101. Here, the display screen generating unit 102 generates information on display screen such that the request information concerning the cancellation input by the cancel information input unit 109 is allowed to be deleted. The storage 104 stores the information on quantity in the deleted request information for every above requirement rank. When request information of order is provided, the requirement management device subtracts the quantity in the information stored by the storage 104 from the quantity in the request information, thereby making it possible to rationalize an amount of in-process compensation.

FIG. 2 is a block diagram representing one example of a hardware structure of the requirement management device according to the present embodiment of this invention.

In FIG. 2, the requirement management device is provided with a central processing unit (CPU) 201, a read only memory (ROM) 202, a random access memory (RAM) 203, a hard disk drive (HDD) 204, a hard disk (HD) 205, a flexible disk drive (FDD) 206, a flexible disk (FD) 207 as an example of a detachable recording medium, a display 208, an interface (I/F) 209, a keyboard 210, a mouse 211, a scanner 212, and a printer 213. Each component is connected to one another by a bus 200.

Here, the CPU 201 controls the whole image processing apparatus. The ROM 202 stores programs such as a boot program. The RAM 203 is used as work area of the CPU 201. The HDD 204 controls read/write of data to the HD 205 according to control of the CPU 201. The HD 205 stores data written under the control of the HDD 204.

The FDD 206 controls read/write of data to FD 207 according to control of the CPU 201. The FD 207 stores data written under the control of the FDD 206 and allows the information processing apparatus to read the data stored in the FD 207. As the detachable recording medium, besides the FD 207, a compact disk (CD)-ROM (CD-read (R), CD-read and write (RW)), a magneto optical disk (MO), a digital versatile disk (DVD), a memory card, and the like may be accepted. The display 208 displays data such as beginning with a cursor, icons or a toolbox, documents, images, and functional information. For example, the display includes cathode ray tube (CRT), thin film transistor (TFT) liquid crystal display, plasma display, and the like.

The I/F (interface) 209 is connected to a network 214 such as local area network (LAN) and the Internet via communication lines, and connected to other severs and information processing apparatus via the network 214. The I/F 209 manages an interface between the network 214 and the inside and controls inputs and outputs of data from other servers and information terminal devices. The I/F 209 is, for example, a modem.

The keyboard 210 is provided with keys to be used for inputting characters, numerals, various instructions, and the like, and is used for data inputs. The keyboard 210 may be an input pad of touch-panel type or a ten keyboard. With the mouse 211, work such as moving a cursor, selecting a range, moving a window and changing its size is carried out. As long as a pointing device has a function similar to that of the mouse, a track ball, a joystick or the like may be accepted.

The scanner 212 optically reads images such as driver image and fetches the image data into the requirement management device. Further, the scanner 212 is provided with an optical character recognition (OCR) function and can also read printed information to convert to data by the OCR function. Furthermore, the printer 213 prints image data and document data such as outline image information. For example, the printer 213 includes a laser printer, an ink jet printer, and the like.

FIGS. 3A to 3E are flowcharts representing procedures of a process by a requirement management method according to the present embodiment of this invention. In the flowchart of FIG. 3A, whether a predetermined time has come is decided (step S301). The predetermined time means a time such as midnight every Saturday set in advance.

In the step S301, when a predetermined time is waited and the predetermined time has come (step S301: Yes), a time limit frame is moved (step S302). Then, whether request information comes to be included in the moved time limit frame is decided (step S303). Here, when the request information is not included in the time limit frame (step S303: No), nothing is carried out and the process advances to step 305.

On the other hand, in the step S303, when the request information comes to be included in the time limit frame (step S303: Yes), a delete process is carried out such that the particular request information is automatically deleted (step S304), and then the process advances to the step S305. The delete process includes processing to clear the possible delivery date corresponding to the particular request information. Further, when a requirement rank that is a target of in-process compensation is to be deleted, information such as quantity is stored.

In the step S305, whether the request information comes to be included in a time limit alarm frame is decided (step S305). Here, when the request information is not included in the time limit alarm frame (step S305: No), nothing is carried out and the series of the process is terminated, followed by being in a stand-by state of the step S301.

On the other hand, in the step S305, when the request information comes to be included in the time limit alarm frame (step S305: Yes), warning information is generated and the generated warning information is output (transmitted) to the client or the broker (step S306). Due to this, the series of the process is terminated, followed by being in a stand-by state of step S301.

Figure 3B:
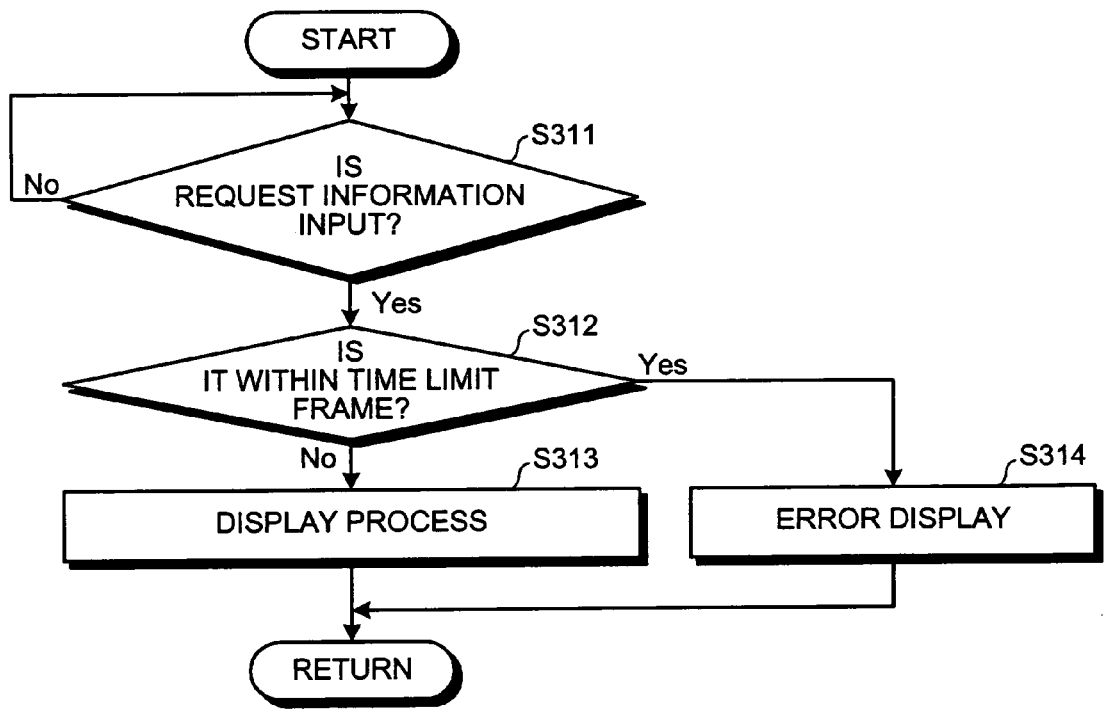

In the flowchart of FIG. 3B, whether the request information is input is decided (step S311). Here, an input of the request information is waited, and when the request information is input (step S311: Yes), whether the position at which the request information is input is in the time limit frame is decided (step S312). Here, when the input position is not in the time limit frame (step S312: No), a display process of the request information is carried out (step S313), and the series of the process is terminated, followed by being in a stand-by state of the step S311.

On the other hand, in the step S312, when the position at which the request information is input is in the time limit frame (step S312: Yes), any input is inhibited at the position, and therefore, an error display is displayed (step S314), an input process is not carried out, and the series of the process is terminated, followed by returning to a stand-by state of the step S311.

Figure 3C:
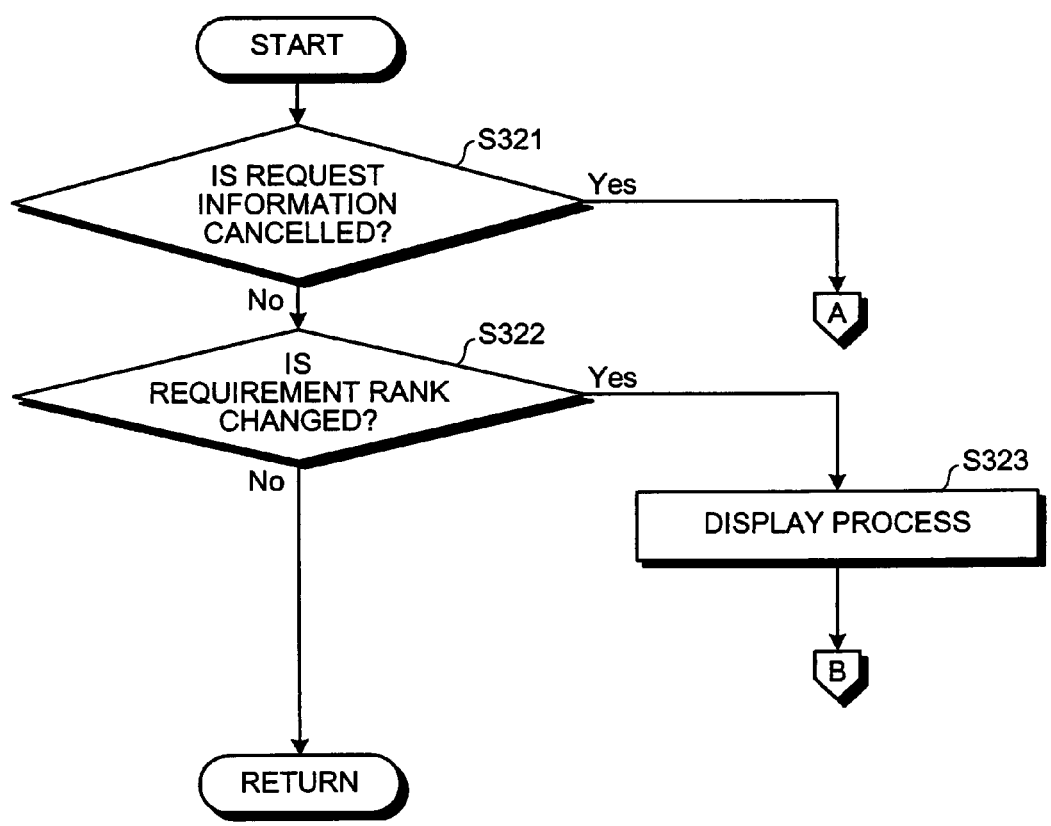

In the flowchart of FIG. 3C, whether a cancellation of the request information having already been input exists is decided (step S321). Here, when a cancellation exists (step S321: Yes), the process advances to the step S304 of the flowchart of FIG. 3A, and subsequently each process in the flowchart of FIG. 3A is carried out.

In the step S321, when a cancellation for the request information having already been input does not exist (step S321: No), whether the requirement rank is changed is decided next (step S322). Here, when the requirement rank is changed (step S322: Yes), display process associated with the change is carried out (step S323), and then the process advances to the step 305 shown in the flowchart of FIG. 3A. Subsequently, each process in the flowchart of FIG. 3A is carried out. In the step S322, when the requirement rank is not changed (step S322: No), the series of the process is terminated.

Figure 3D:
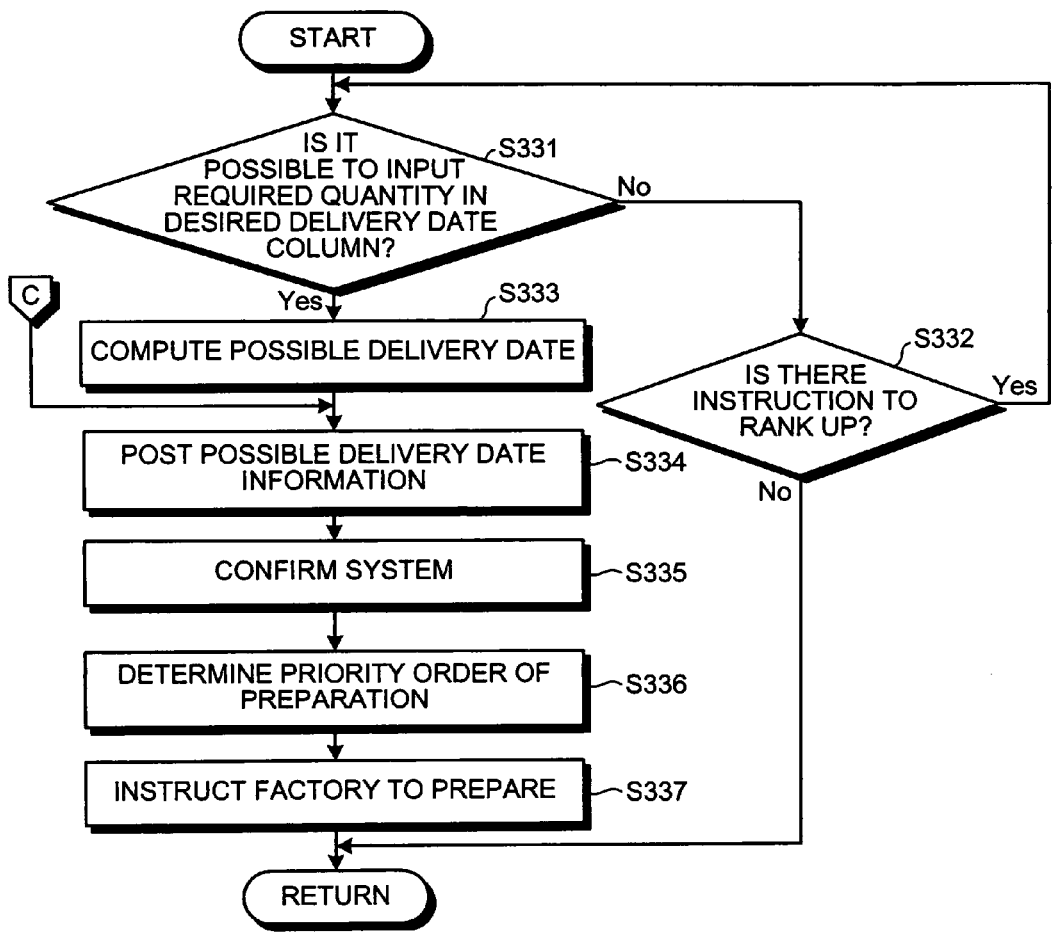

FIG. 3D and FIG. 3E represent the procedures of more specific process. In FIG. 3D, when request information is input, whether an input of a required quantity is possible in the desired delivery date column is decided in the input column displayed on the display screen (step S331). Here, when the input is not possible (step S331: No), whether an instruction to rank up in the requirement rank for the same delivery date has been provided is decided (step S332). Here, when the instruction to rank up has been provided (step S332: Yes), the process returns to the step S331, and whether the required quantity can be input in the desired delivery date column in the rank to which the instruction is provided to rank up is decided again (step S331). On the other hand, in the step S332, when no instruction to rank up has been provided (step S332: No), the series of the process is terminated.

In the step S331, when the required quantity can be input in the desired delivery date (step S331: Yes), a possible delivery date with respect to the input required quantity is computed (step S333), and the possible delivery date information computed is posted (step S334). Further, the system (for example, the contents of information on the requirement rank shown in FIG. 5 that will be explained later) is confirmed (step S335), and furthermore, in some cases, a priority order of preparation is determined (step S336), and a preparation instruction to proceed to the next step is provided to the factory (step S337), whereby the series of the process is terminated, followed by being in a stand-by state of the step S331.

The order of the processes form the step S334 to the step 337 is not limited to the above. For example, the step S333 and the step S334, and the step S335 to the step S337 may be carried out in this order, respectively. However, the step S335 to the step S337 may be carried out earlier, and then the steps S333 and 334 may be carried out later.

Next, in FIG. 3E, whether a warning of requirement deletion has been given due to the move of the time limit frame is decided, that is, whether the request information is put in the time limit alarm frame is decided (step S341). Then, a warning of requirement deletion is waited to be given. When the warning of requirement deletion is given (step S341: Yes), warning information is transmitted to the sales department (step S342). Next, whether an instruction to rank up the requirement rank has been provided with respect to the particular request information is decided (step S343).

In the step S343, when the instruction to rank up is provided (step S343: Yes), netting (that is, offset by the lower rank) is carried out (step S344), and a process of passing the possible delivery date (from the particular lower rank) is carried out (step S345). Then, the process advances to the step S334 shown in FIG. 3D, and subsequently, each step of the steps S334 to S337 shown in FIG. 3D is carried out.

On the other hand, in the step S343, when there is no instruction to rank up (step S343: No), the requirement is deleted (step S346), and upon this, an instruction that preparation for the next step should be halted is provided to the factory (step S347). Then, the system (for example, the contents of the information on the requirement rank shown in FIG. 5 explained later) is confirmed (step S348). At this time, whether the rank is a target of in-process compensation is decided (step S349). When, for example, the rank such as "order", "A rank", or "*B rank" described later is a target of in-process compensation (step S349: Yes), the process advances to a compensation claim process. On the other hand, for example, when the rank such as "B rank" described later is not a target of in-process compensation (step S349: No), the series of the process is terminated, followed by being in a stand-by state of the step S341.

EXAMPLE

Figure 4:
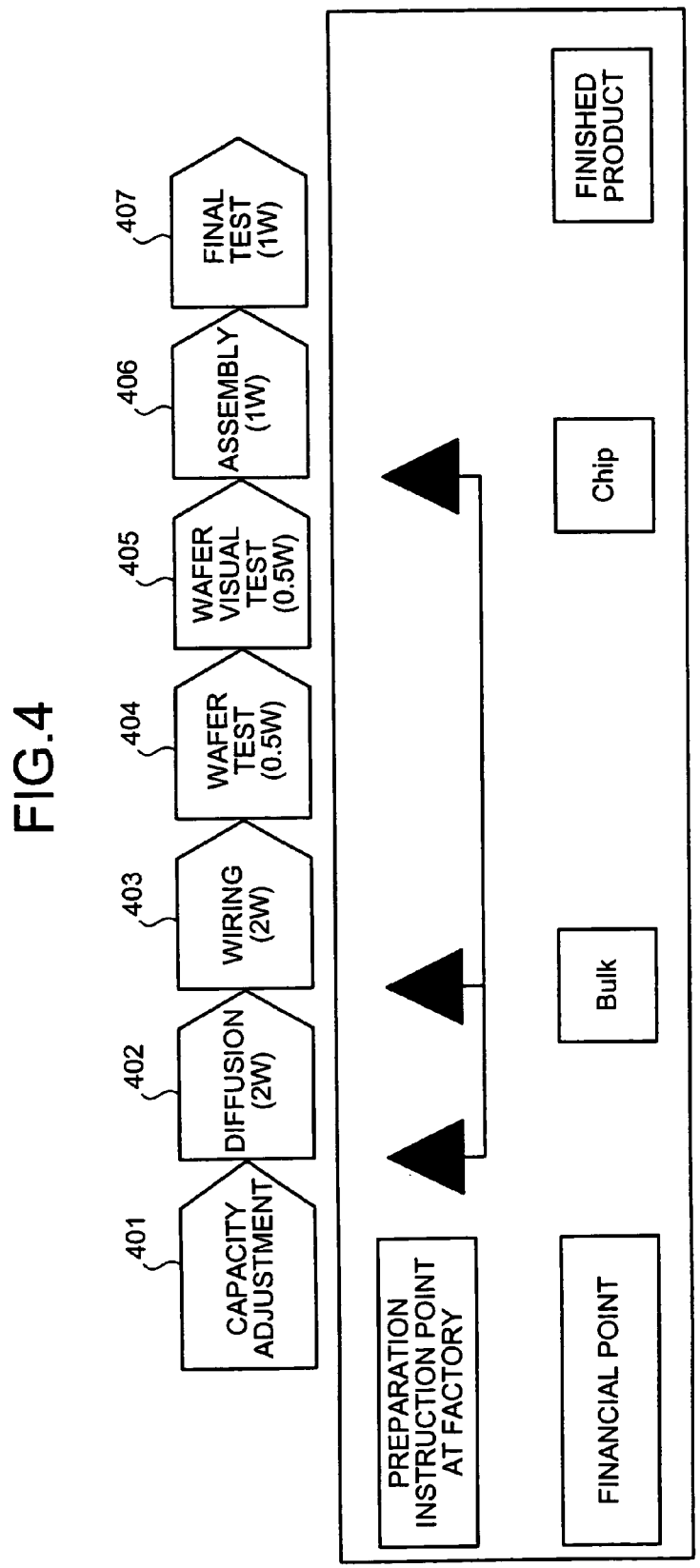
FIG. 4 is a detailed diagram to explain one example of a manufacturing process of a semiconductor product according to an example.

FIG. 4 is a detailed diagram to explain an example of manufacturing process of a semiconductor product according to the present example of this invention. The manufacturing process of a semiconductor product shown in FIG. 4, as one example, consists of a "capacity adjustment" step 401, a "diffusion" step 402 of ca. two weeks, a "wiring" step 403 of ca. two weeks, a "wafer test" step 404 of 0.5 week, a "wafer visual test" step 405 of ca. 0.5 week (that is, about one week of the "wafer test" step 404 and the "wafer visual test" step 405), an "assembly" step 406 of ca. one week, and a "final test" step 407 of ca. one week. Accordingly, it takes about seven weeks from preparation (start of the "diffusion" step 402) to completion of a finished product (end of the "final test" step 407).

A point of preparation instruction at the factory differs depending on requirement ranks. Each point is determined at the time when the "diffusion" step 402 starts, the time when "wiring" step 403 starts after finishing the "diffusion" step 402, or the time when the "assembly" step 406 starts after finishing the "wafer visual test" step 405. A financial point (that is, how far a product is fabricated depends on the requirement rank) also differs depending on the requirement ranks. There are a case where a product is fabricated up to "Bulk (a state before starting the "wiring" step 403 after finishing the "diffusion" step 402", a case where the product is fabricated up to "Chip (a state before starting the "assembly" step 406 after finishing the "wafer visual test" step 405")", and a case where the product is fabricated up to "finished product (a state where the "final test" step 407 is completed)", respectively.

Next, the requirement ranks are explained. FIG. 5 is a detailed diagram to explain a list of requirement ranks according to the present example of this invention. In FIG. 5, each of "order", "A rank", "*B rank", and "B rank" is in the requirement ranks. Further, in the "A rank", there are categories of "full custom" and "semi-custom". In the "*B rank", there is only one category of "full custom", and there are categories of "full custom" and "semi-custom" in the "B rank". The "order" is explained hereinafter as one kind of the requirements.

Here, when a requirement rank is "order", that is, when an order is fixed, a financial point is "fabricate up to finished product" in all categories, a time limit (that is, a point to decide whether preparation for the next step should be started based on the notified requirement rank) is "none", and in-process compensation (that is, compensation born by the orderer when the product is cancelled) exists, that is, "Yes".

When a requirement rank is "A rank", the financial point is "fabricate up to Chip", and the time limit is "2W (assembly to final test)" in either category of "full custom" or "semi-custom". Therefore, the requirement of "A rank" cannot be input during the "2W (assembly to final test)", and "in-process compensation" exists, that is, "Yes".

When the requirement rank is "*B rank", the financial point is "fabricate up to Bulk", and the time limit is "5W (wiring to final test)". Therefore, the requirement of "*B rank" cannot be input during the "5W (wiring to final test)", and "in-process compensation" exists, that is, "Yes".

When the requirement rank is "full custom" in "B rank", there is no financial point, and only capacity adjustment is carried out. Its time limit is "7W (diffusion to final test)".

Therefore, the requirement of "full custom" in "B rank" cannot be input during the "7W (diffusion to final test)".

When the requirement rank is "semi-custom" in "B rank", the financial point is "fabricate up to Bulk", and the time limit is "5W (wiring to final test)". Therefore, the requirement of "semi-custom" in "B rank" during the "5W (wiring to final test)" cannot be input.

Next, a liaison between the operational flow of a full custom product and the requirement management system is explained. FIGS. 6 (FIG. 6A and FIG. 6B) to FIGS. 10 (FIG. 10A and FIG. 10B) are detailed diagrams to explain a liaison between the operational flow of a full custom product and the requirement management system. In FIG. 6A, the present time is in the week of October 1. With respect to a product number "MB12345-XXX-678", a requirement application cannot be filed in a time limit frame (frame filled in with black) 601. Therefore, the requirement application can be filed only in a frame other than the time limit frame 601.

The numerals 602, 603, and 604 are time limit alarm frames (frames diagonally shaded). Requirements displayed in these frames 602, 603, and 604 are to be deleted the next week when no input to rank up is done. Ranking up means that, for example, when a requirement is in B rank, the B rank is changed to any one rank of order, A rank, and *B rank, when a requirement is in *B rank, the *B rank is changed to either order or A rank, and when a requirement is in A rank, the A rank is changed to order.

Here, when a quantity of 500 with a desired delivery date in the week of November 19 is applied with B rank (assuming that the application is "requirement A"), it is found that the quantity is input in the predetermined frame (the time limit alarm frame 604). Further, when a quantity of 300 with a desired delivery date in the week of November 26 is applied with B rank (assuming that the application is "requirement B"), it is found that the quantity is input in the predetermined frame (605). In this way, even though a requirement is input in B rank, a supply schedule is input. However, only capacity adjustment is carried out, and actual preparation is not carried out because of B rank. In FIG. 6B, a list of desired delivery date, quantity and possible delivery date of each requirement is presented.

As to the B rank, the week of November 19 is in the time limit alarm frame 604, and the requirement A is also displayed in the time limit alarm frame 604, and therefore, unless the rank of the requirement A is ranked up, the requirement A is automatically deleted the next week. From FIG. 6B, it is found that the possible delivery date (a delivery date that factory appoints) of the requirement A is November 20 and the possible delivery date of the requirement B is November 30.

Figure 7A:
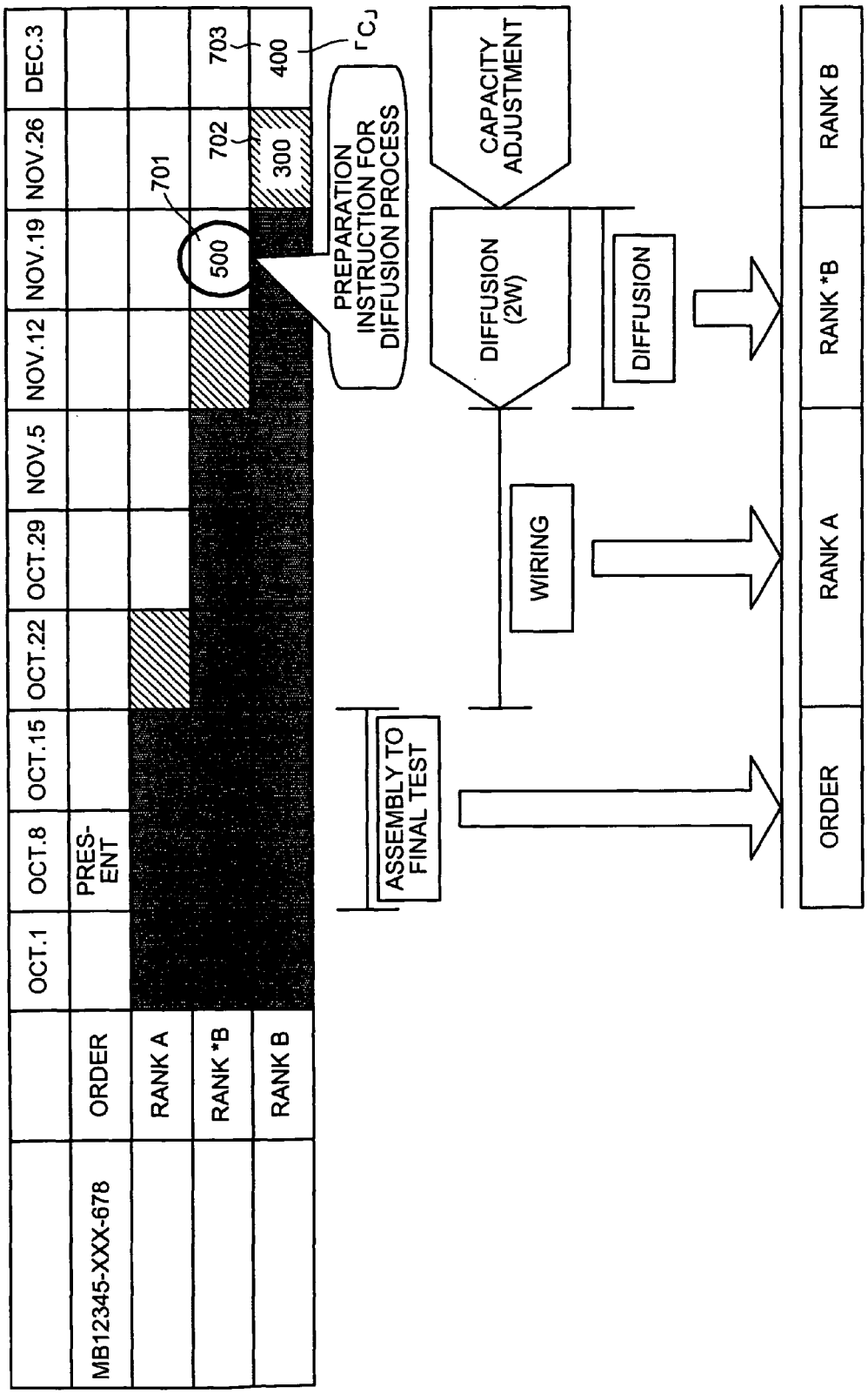
FIG. 7A is a detailed diagram to explain a liaison between an operational flow of a full custom product and a requirement management system (part 2)

In FIG. 7A, since the rank of the requirement A is ranked up (B rank→*B rank) after one week has passed with respect to FIG. 6A (701), a preparation instruction for diffusion step is provided. At this time, the possible delivery date (November 20) is also passed over. Further, since the requirement B is displayed in a time limit alarm frame 702, the requirement B is automatically deleted the next week unless the rank of the requirement B is ranked up. Still further, FIG. 7A represents that an additional quantity of 400 is input in B rank (requirement C) with a desired delivery date in the week of December 3 (703) and that a possible delivery date (December 3) is newly set. A list of desired delivery date, quantity, and possible delivery date of each requirement is presented in FIG. 7B.

In FIG. 8A, since the rank of the requirement B is ranked up (B rank→*B rank) after one week has passed with respect to FIG. 7A (802), a preparation instruction for diffusion step is provided. At this time, the possible delivery date (November 30) is also passed over. Further, since the requirement A is displayed in a time limit alarm frame 801, the requirement A is automatically deleted the next week unless the rank of the requirement A is ranked up. Still further, since the requirement C is also displayed in a time limit alarm frame 803, the requirement C is automatically deleted the next week unless the rank of the requirement C is ranked up. A list of desired delivery date, quantity, and possible delivery date of each requirement is presented in FIG. 8B.

In FIG. 9A, since the requirement A is ranked up (*B rank→A rank) after one week has passed with respect to FIG. 8A (901), a preparation instruction for wiring step is provided. At this time, the possible delivery date (November 30) is also passed over. Further, since the rank of the requirement C is ranked up (B rank→*B rank) (903), an additional preparation instruction for diffusion step is provided. At this time, the possible delivery date (December 3) is also passed over. Since the requirement B that has been in the diffusion step is displayed in a time limit alarm frame 902, the requirement B is automatically deleted the next week unless the rank of the requirement B is ranked up. A list of desired delivery date, quantity, and possible delivery date of each requirement is presented in FIG. 9B.

Figure 10A:
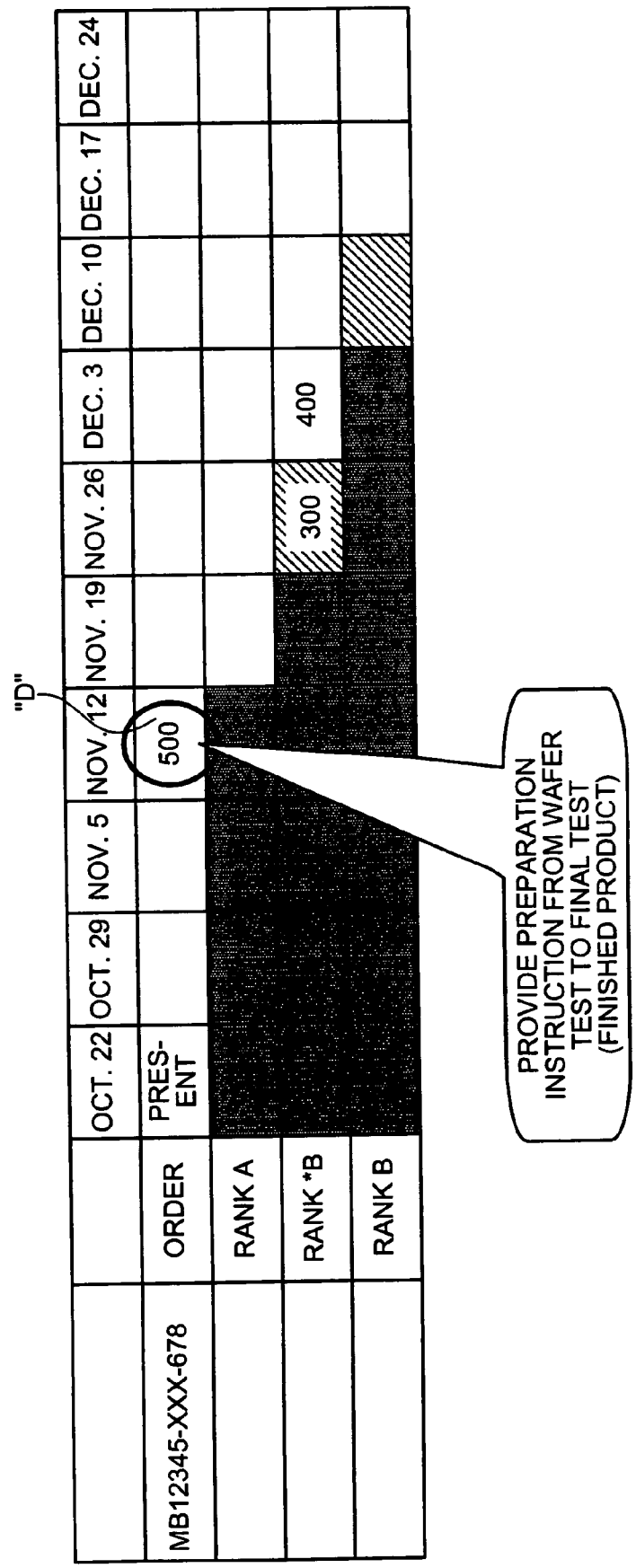
FIG. 10A is a detailed diagram to explain a liaison between an operational flow of a full custom product and a requirement management system (part 5)

In FIG. 10A, a quantity of 500 with a desired delivery date in the week of November 12 in the rank of order (requirement D) is applied, and the order entry is received in the same week as that in FIG. 9A. Based on this, the requirement A with the earliest desired delivery date is netted (cancellation), and a preparation instruction for assembly step and final test step is provided. Details of a netting function (cancellation) are described later. A list of desired delivery date, quantity, and possible delivery date of each requirement is presented in FIG. 10B.

In FIG. 11A, unless the rank of the requirement A is ranked up, that is, unless it is ranked up to any one of *B rank, A rank, or order after one week has passed with respect to FIG. 6A, not only is the requirement A automatically deleted but also a right of the supply schedule of November 20 is lost. In other words, it is taken for granted that unchanging the rank means abandoning its priority order of preparation. A list of desired delivery date, quantity, and possible delivery date of each requirement is presented in FIG. 11B. In FIG. 11B, a deleted requirement (requirement A) is represented by laying a line for elimination.

Figure 12:
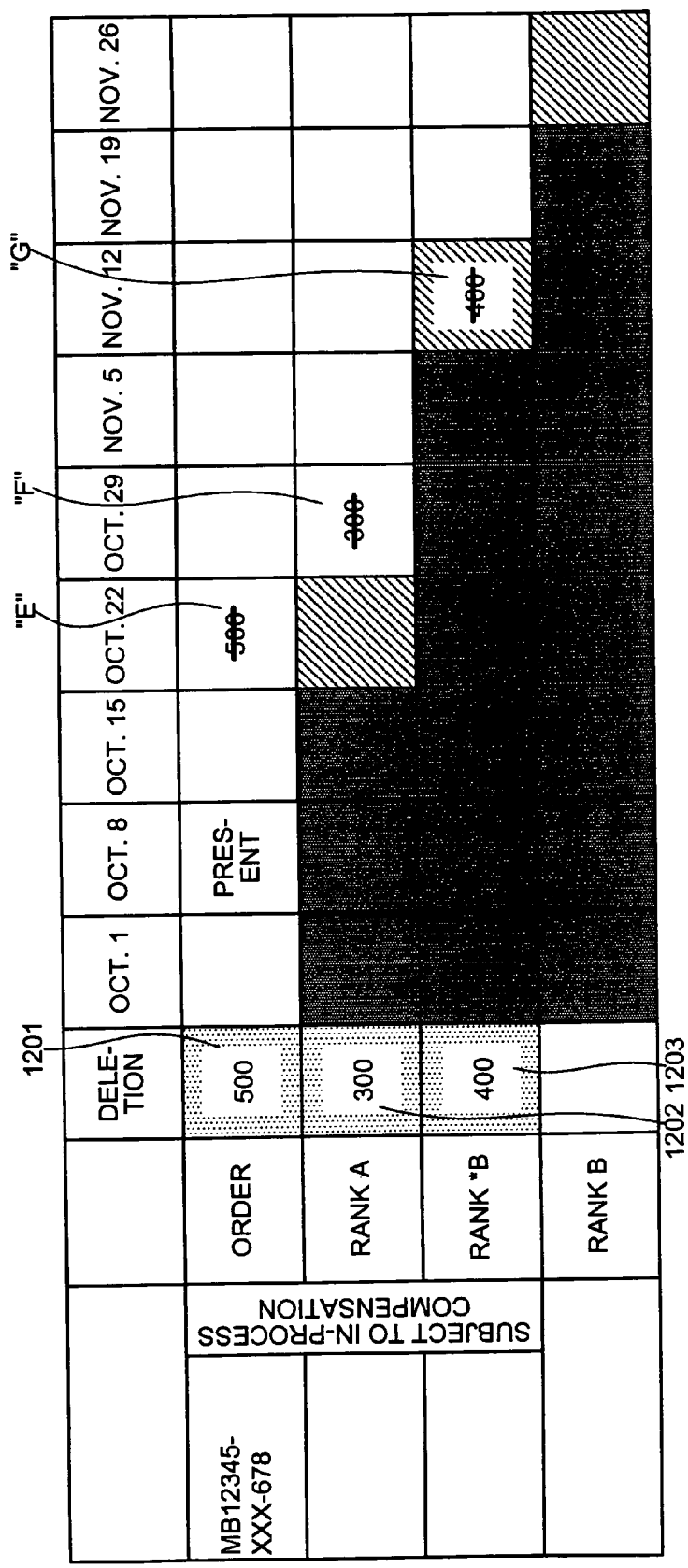
FIG. 12 is a detailed diagram to explain a liaison between an operational flow of a full custom product and a requirement management system (part 7)
Figure 13:
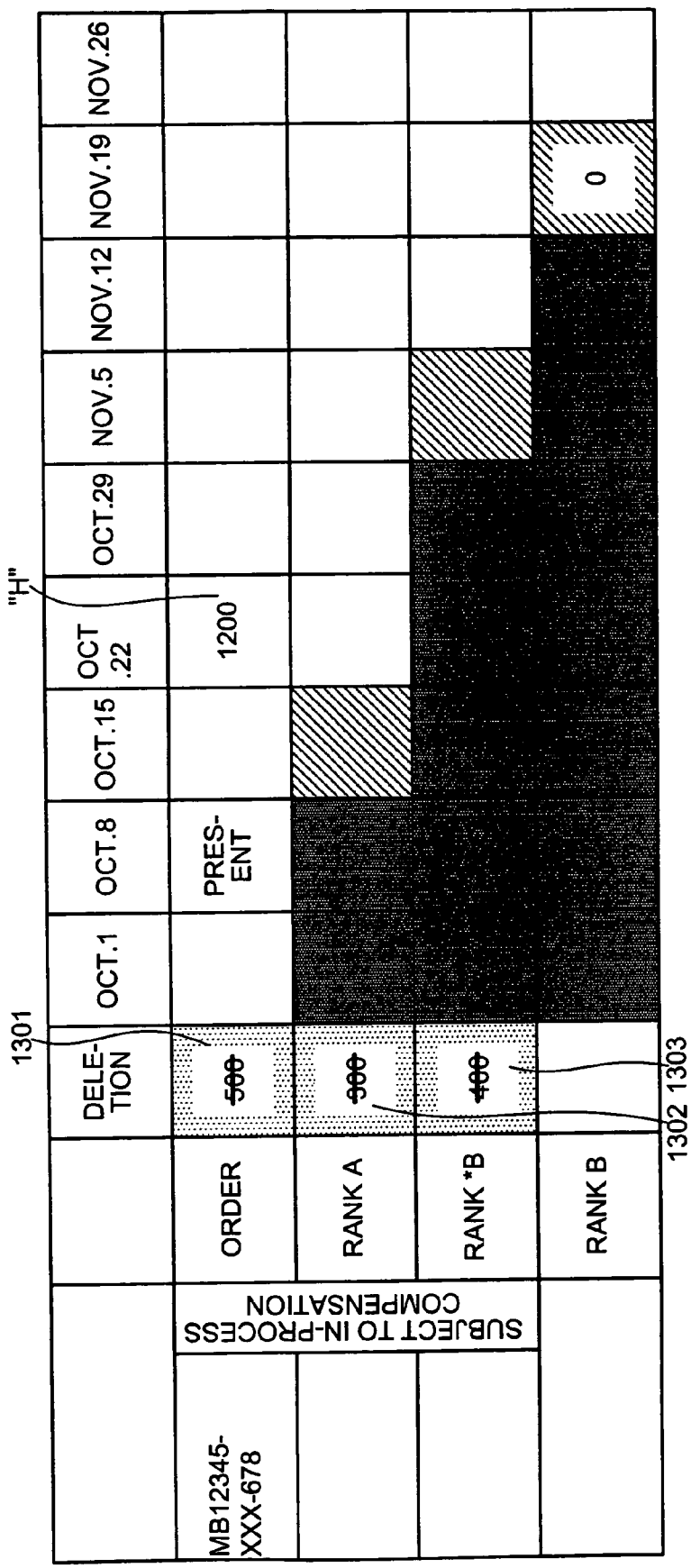
FIG. 13 is a detailed diagram to explain a liaison between an operational flow of a full custom product and a requirement management system (part 8)

With the use of FIGS. 12 and 13, a case in which cancellations of order, A rank, and *B rank that become targets of in-process compensation are input is explained. FIG. 12 represents a state in which a requirement of a quantity of 500 with a desired delivery date in the week of October 22 having been applied in the rank of order (requirement E), a requirement of a quantity of 300 with a desired delivery date in the week of October 29 having been applied in A rank (requirement F), and a requirement of a quantity of 400 with a desired delivery date in the week of November 12 in *B rank having been applied (requirement G) are all cancelled and an input of the cancellations is done in the week of October 8.

The quantities of the requirements having been cancelled are laid over with lines to be eliminated, and the same numbers as the quantities are input in the delete columns 1201, 1202, and 1203. That is, "500" of the requirement E, "300" of the requirement F, and "400" of the requirement G are input in the delete columns 1201, 1202, and 1203, respectively, as deleted requirements. These delete columns 1201, 1202, and 1203 are columns to confirm how many pieces of targets of in-process compensation there are. Therefore, even though a requirement in B rank is cancelled, the number of pieces is not input in the delete column because B rank is not a target of in-process compensation.

In-process compensation claim amounts to, for example, 100% of the cost when a requirement is in the rank of order because the order means a finished product, about 60% when in A rank because the A rank means Chip, and about 30% when in *B rank because *B rank means a diffusion step. However, the amount of the above in-process compensation claim may sometimes vary depending on quantities. The cancel information is immediately transmitted to the factory, followed by halting the step promptly. Further, the possible delivery dates of each of the requirements that have been cancelled are all to be cleared.

After this, in FIG. 13, when a quantity of 1200 with a desired delivery date in the week of October 22 in the rank of order is applied (requirement H), a numeral of 1200 is input, and the "500" of deleted requirement of order in a delete column 1301, "300" of deleted requirement of A rank in a delete column 1302, and "400" of deleted requirement of *B rank in a delete column 1303 are laid over with a line, whereby these deleted requirements are cleared and preparation is carried out again. In this way, when a new order is input and preparation is resumed, a possible delivery date is newly provided. However, possible delivery dates retained in the past are cleared and not passed over.

The netting function is composed of a requirement deletion function and a pass-over function for possible delivery date. The requirement deletion function is a function that subtracts a quantity of the input order from the quantities of the requirements to avoid duplication of the required quantities in a case where the requirement applications have been filed and the order entry is received later. Deletion is carried out by subtracting a quantity beginning with a requirement with an earlier time (either a date of desired delivery date or a date of possible delivery date) or beginning with a requirement in a higher rank when the time is the same. However, the deletion is not limited to this manner but may be carried out by subtraction beginning with a requirement in a higher rank, and when the rank is the same, deletion may be carried out by subtraction of a requirement with an earlier time. The requirement deletion is applied only to a case where a combination of model and client code is the same.

Figure 14A:
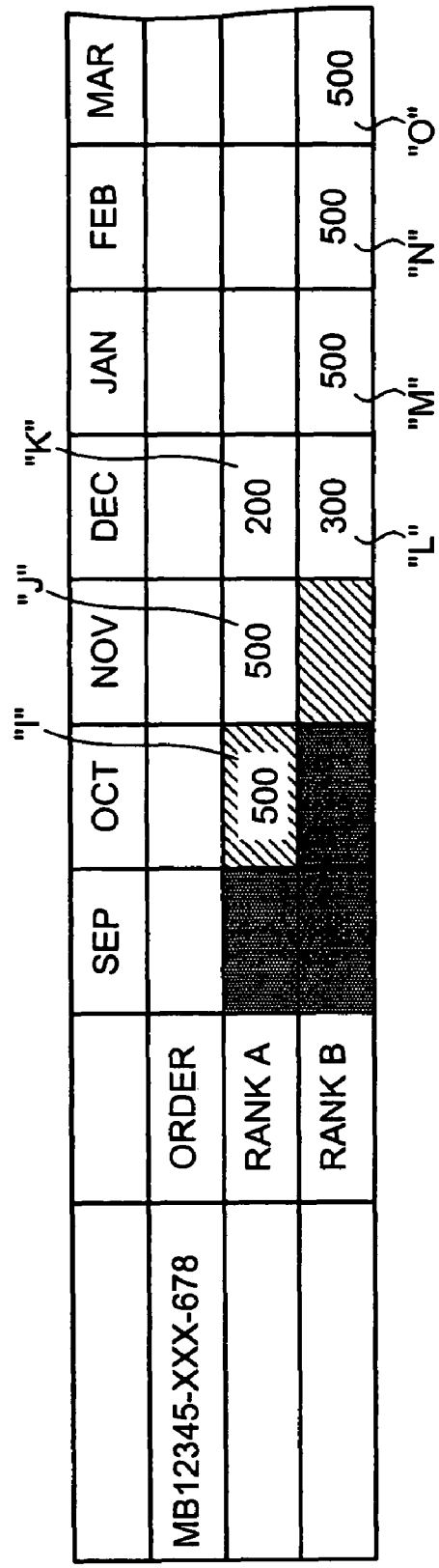
FIG. 14A is a detailed diagram to explain a requirement deletion function (part 1)
Figure 14B:
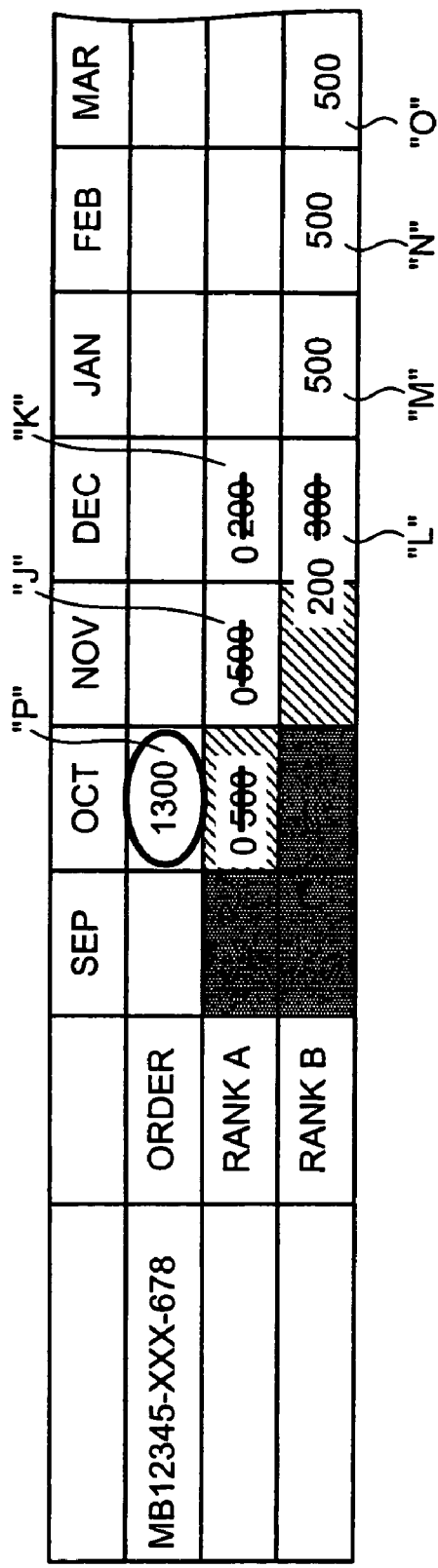
FIG. 14B is a detailed diagram to explain a requirement deletion function (part 2)

FIGS. 14 (FIG. 14A and FIG. 14B) are detailed diagrams to explain the requirement deletion function. FIG. 14B represents the display contents of FIG. 14A on the next day. In FIG. 14A, a quantity of 500 with a desired delivery date in October (requirement "I"), a quantity of 500 with a desired delivery date in November (requirement "J"), and a quantity of 200 with a desired delivery date in December (requirement "K") of requirements in A rank, respectively, and a quantity of 300 with a desired delivery date in December (requirement "L"), a quantity of 500 with a desired delivery date in January (requirement "M"), a quantity of 500 with a desired delivery date in February (requirement "N"), and a quantity of 500 with a desired delivery date in March (requirement "O") of requirements in B rank, respectively, are applied (input), respectively.

When a quantity of 1300 with a desired delivery date in October in the rank of order (requirement "P") is newly input the next day, the order quantity of 1300 input is subtracted from the required quantities having already been input. Therefore, 500 of the requirement "I" of October and 500 of the requirement "J" in November are subtracted in the order of earlier time. This leads to 300 that is the rest of the quantity resulting from subtraction of 1000 from 1300.

Next, in December, 200 of the requirement "K" in A rank, 300 of the requirement "L" in B rank are displayed. When the time is the same, subtraction begins with from a higher rank, and therefore, 200 of the requirement "K" is first subtracted, and the remaining 100 is subtracted from 300 of the requirement "L". As the result, the remaining quantity of the requirement "L" is 200. As to the requirements "M" to "O", they are not changed. FIG. 14B represents a state in which the new order (requirement "P") is input, the quantities of each of the requirements "I" to "L" are subtracted, lines are laid over, respectively, and the remaining quantities are displayed.

Next, the pass-over function for possible delivery date is explained. The pass-over function for possible delivery date is a function that presents a possible delivery date (supply schedule) when a requirement is applied, and then, when an order is input, the supply schedule is passed over to the order. When a requirement is automatically deleted due to the time limit, it is taken for granted that the possible delivery date is also abandoned, followed by clearing the financial allowance and the priority order of the preparation. When the requirement is deleted (cancelled) manually, it is taken for granted that the possible delivery date is similarly abandoned.

FIG. 14C to FIG. 14E are charts to explain statuses of holding possible delivery dates. FIG. 14C corresponds to FIG. 14A, and FIG. 14D and FIG. 14E correspond to FIG. 14B. With respect to the status of holding possible delivery dates shown in FIG. 14C, the requirement "P" is newly input the next day, and therefore, the contents of the status of holding possible delivery dates are changed to those shown in FIG. 14D. That is, the possible delivery dates that each requirement retains are passed over to the requirement "P" once. FIG. 14E represents a status in which the desired delivery dates are moved forward as much as possible after examining statuses of the possible delivery dates for other clients and the like in batch processing. That is, the possible delivery date of "November 7" is moved forward to "October 15", the possible delivery date of "December 1" to "October 20", and the possible delivery date of "December 5" to "October 20", respectively.

Figure 15:
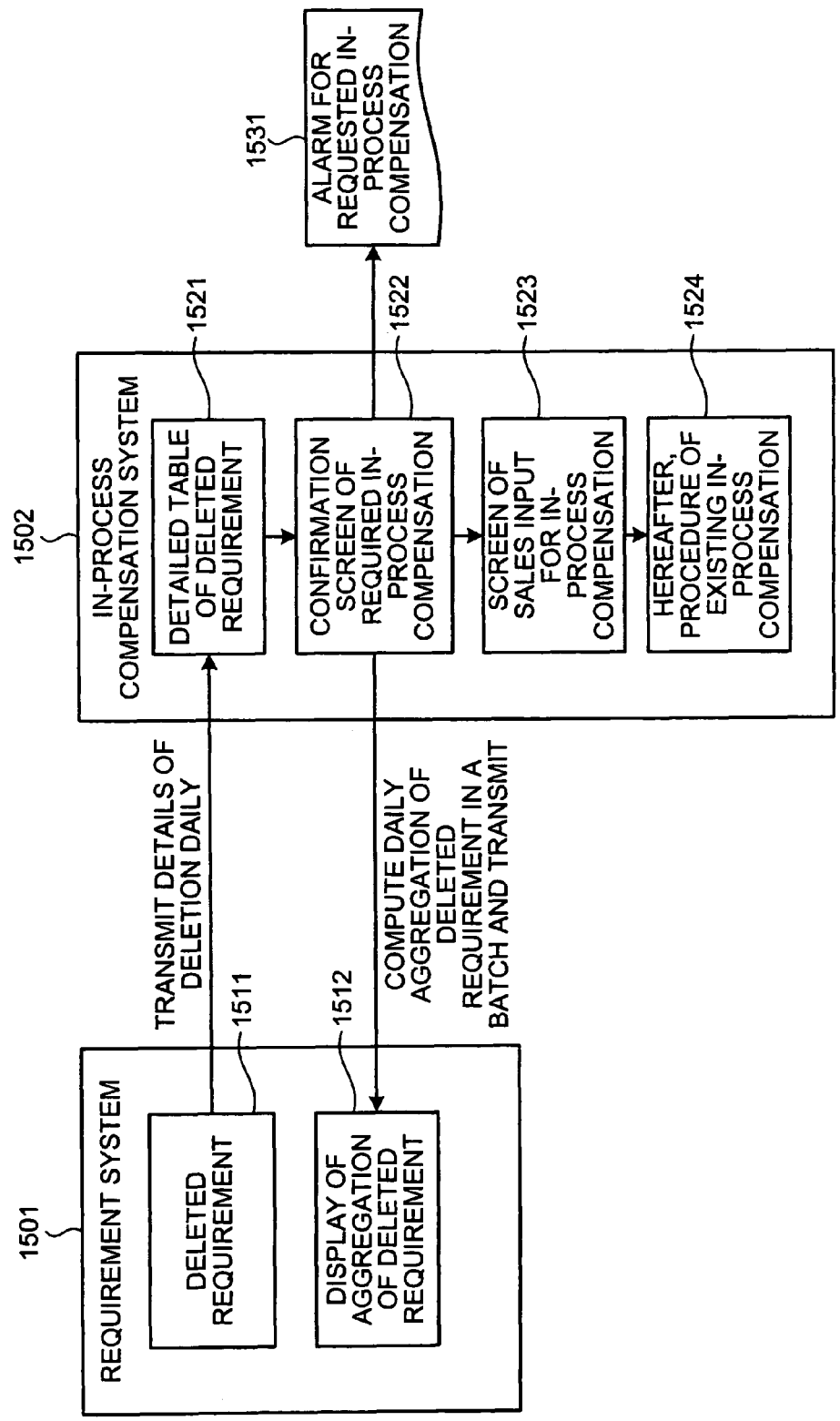
FIG. 15 is a schematic diagram representing a liaison between a requirement system and an in-process compensation system.

FIG. 15 is a schematic diagram representing a liaison between a requirement system and an in-process compensation system. In FIG. 15, a numeral 1501 represents the requirement system and 1502 represents the in-process compensation system.

In the requirement system 1501, when a deleted requirement 1511 is generated, information on details of the deletion is transmitted to the in-process compensation system 1502 daily (everyday approximately at the same time). The deleted requirement 1511 is an aggregation of deleted requirements including requirements (A and *B) involving in-process compensation. On the display, it represents an aggregation; however, each requirement retains its details. Further, deletion represents a case where when quantities of requirements are decreased, an increase in quantity of requirements in the same or higher rank is small.

In the in-process compensation system 1502, information on the details of the deletion transmitted is registered on a detailed table of deleted requirement 1521. Then a confirmation screen of required in-process compensation 1522 is generated and displayed based on the information of the detailed table of detailed requirement 1521. Further, a screen of sales input for in-process compensation 1523 is generated and displayed, followed by proceeding to a "hereafter procedure of existing in-process compensation" 1524. Furthermore, an alarm for requested in-process compensation 1531 is output.

Figure 16A:
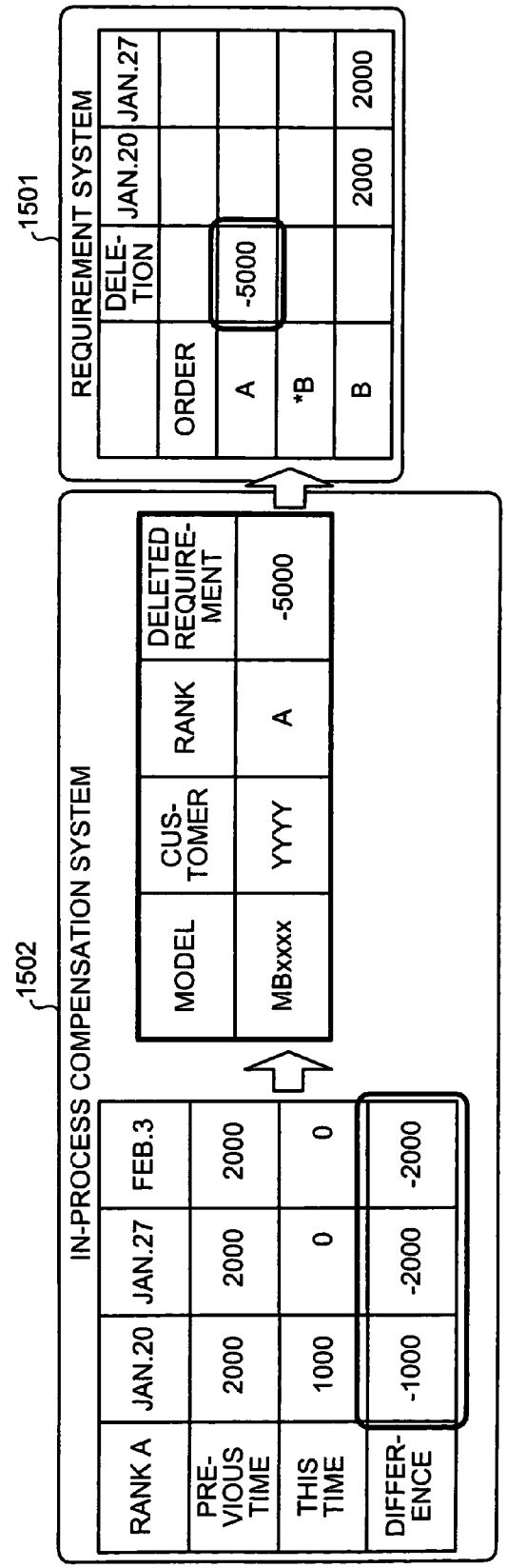
FIG. 16A is a detailed diagram to explain contents of a liaison between requirements and in-process compensation.

Still further, in the in-process compensation system 1502, an aggregation of the deleted requirements is computed in a batch processing daily and transmitted to the requirement system 1501. The requirement system 1501 carries out a display of the aggregation of the deleted requirement 1512 that has been transmitted. Specifically, the requirement system 1501 compares the requirements of the previous day with the remaining order in a daily batch processing, and when a deleted requirement is newly generated resulting from the comparison, or when a requirement to decrease deleted requirements with respect to the combination of the model and client that is already in deleted requirements is generated, the detailed data is transmitted to the in-process compensation system 1502. Its contents are shown in FIG. 16A and FIG. 16B. In FIG. 16A and FIG. 16B, "−1000" of the deleted requirement of January 20, "−2000" of the deleted requirement of January 27, and "−2000" of the deleted requirement of February 3 are aggregated and its aggregation of the deleted requirements, "−5000", is transmitted to the requirement system 1501 as a deleted requirement in A rank.

FIG. 17 is a detailed diagram to explain the contents of decreases of the deleted requirements. In FIG. 17, a deleted requirement of "−5000" in A rank has existed before an order is input, and 3000 in the rank of order is input, which decreases the quantity of the deleted requirements by the quantity of the order input, resulting in the total of "−2000". At this time, deletion is carried out from a requirement with an earlier required date. Accordingly, "−1000" of the required date of "January 20" and "−2000" of the required date of "January 27" are deleted, and "−2000" of the required date of "February 3" remains. This results in that the quantity of the deleted requirement of A rank after inputting the order is "−2000".

FIG. 18 is a detailed diagram to explain one example of a display screen. In FIG. 18, date is set to the horizontal axis and requirement rank is set to the vertical axis, thereby showing a matrix display. "M1", "M2", "M3" etc. represent "calendar months", and actual calendar months ("January", "February", "March") are displayed. Further, "W1", "W2", "W3", etc. represent "week", and actual weeks ("the first week", "the second week", "the third week", etc.) are displayed. The portions filled in with black are time limit frames and the portions diagonally shaded are time limit alarm frames. Furthermore, the "SS" represents information on possible delivery date, and a quantity to be delivered in the applicable week is displayed in the "SS" row. In FIG. 18, the contents of a week are displayed for every week for four months, and the contents after fifth month are displayed for every month.

The cells in the portions filled in with black that are time limit frames are locked and shifted every week. When there is an important item of which time limit has expired at the time of shifting, the requirement is automatically deleted. When there is a change in move at the factory, the locked portion is also changed. Every requirement retains its supply schedule, and when the requirement is of the same model and client's requirement, the supply schedule is passed over. Further, when a requirement is input, a preparation instruction is provided to the factory based on the rank of the requirement the next day. In addition, when an order is input, the same quantity as of the order is subtracted from those of the requirements, thereby avoiding duplication of the requested quantity. "Dropped" represents deleted requirement. Since requirements in A and *B ranks become targets of preparation for custom product, they become targets of in-process compensation unless they are ranked up to order, which makes data tracking possible in the form of deleted requirement.

As is explained heretofore, according to the present embodiment, when manufacturing a part is requested, request information including at least information on a desired delivery date for the applicable product, information on a desired quantity of the product, and information on which step the product is fabricated to (requirement rank information) is input, information on a display screen to display a list of all or part of the request information input is generated, and the information generated on the display screen is output, thereby making it possible to grasp the client's request status with ease. Owing to this, it is possible to grasp a client's request status with ease, to respond to the client's request flexibly, manage the requirements efficiently and reliably to rank the requirement information, and provide an instruction to the factory appropriately and promptly corresponding to the requirements by clarifying the meaning of the ranking. "Appropriately" includes, for example, furnishing details on how far the step is allowed to proceed.

According to the present embodiment, the display screen displays not only information on desired delivery date in time series but also the information on desired delivery date and the requirement rank information in a matrix form, information on quantity is input to an applicable position in the matrix display, thereby displaying the input information on the quantity at the applicable position, and information on display screen is generated such that, at the predetermined position on the matrix display, an input of information on quantity to the position is inhibited by displaying the position using a display method different from that for other positions. Further, the position at which an input is inhibited is moved in the time series direction at every predetermined time, and information on display screen is generated such that the request information related to the information on quantity having been displayed at the moved position is automatically deleted. Therefore, the requirements can be managed efficiently and reliably.

According to the present embodiment, the information on quantity in the request information that has been automatically deleted is stored for every requirement rank. Further, when information on quantity is displayed at the position where an input is to be inhibited upon a next move, warning information is generated and the generated warning information is output. Furthermore, an input of the request information is inhibited at the times of predetermined desired delivery dates set for every requirement rank information. When the input request information reaches the time of a predetermined desired delivery date without any change in the requirement rank information, the request information is automatically deleted, and therefore, the requirements can be managed efficiently and reliably.

According to the present embodiment, a possible delivery date for a request is computed based on the input request information, and when the requirement rank information in the request information is changed, the information on the computed possible delivery date is passed over to the request information that has been changed. When a possible delivery date of a request is computed based on the input request information, and when the rank of order is input as requirement rank information in the request information, the information on the computed possible delivery date in the request information that has already been input and has a requirement rank other than the order is passed over to the request information of the order. Further, a cancellation of the request information having already been input is accepted, and information on display screen is generated such that the input request information related to the cancellation is deleted. The information on quantity in the deleted request information is stored for every requirement rank. When there is request information of order, a quantity related to the information stored is subtracted from the quantity of the request information. Thus, the requirement management device, the requirement management method, and the requirement management program capable of dealing flexibly with a request from a client can be obtained.

The requirement management method explained in the present embodiment can be realized by implementing a program prepared in advance on a computer such as personal computer or workstation. The program is implemented by being stored in a recording medium such as hard disk, flexible disk, CD-ROM, MO, or DVD that is readable by a computer and being read out from the recording medium by a computer. The program may be a transmitting medium that can be distributed through network such as the Internet.

According to the present invention, it becomes possible to grasp a client's request status with ease, deal flexibly with a request of the client, manage requirements efficiently and reliably, and provide instructions to the factory corresponding to the requirements appropriately and promptly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A requirement management device for a product that is manufactured through a plurality of steps, comprising:
   a request information input unit that accepts an input of request information, at the time of making a request of manufacturing the product, the request information including at least information on desired delivery date for the product, information on desired quantity of the product, and requirement rank information that is information on which step among the steps the product is manufactured to;
   a display screen generating unit that generates information on display screen on which a list of all or part of the request information input by the request information input unit is displayed; and
   an outputting unit that outputs the information on display screen generated by the display screen generating unit,
   wherein the display screen displays the information on desired delivery date in time series, the information on desired delivery date and the requirement rank information in a matrix display, and the information on quantity is input to an applicable position on the matrix display, thereby displaying the input information on quantity at the applicable position on the matrix display,
   wherein the step among the steps to which the product is manufactured is selected from the group consisting of:
   diffusion,
   wiring,
   assembly, and
   wafer visual test.

2. The requirement management device according to claim 1, wherein the display screen generating unit generates information on the display screen such that, at a predetermined position in the matrix display, an input of the information on quantity to the position is inhibited by displaying the position with the use of a display method different from that for other positions.

3. The requirement management device according to claim 2, wherein the display screen generating unit moves the position where an input is inhibited in the time series direction at every predetermined time and generates information on the display screen such that the request information related to the information on quantity displayed at the moved position is automatically deleted.

4. The requirement management device according to claim 3, further comprising a storage unit that stores therein the information on quantity in the request information automatically deleted, for each of the requirement rank.

5. The requirement management device according to claim 4, wherein when there is request information of the finished product, the quantity related to the information stored by the storage unit is subtracted from the quantity of the request information.

6. The requirement management device according to claim 3, further comprising:
   a warning information generating unit that generates warning information when the information on quantity is displayed at the position where an input is to be inhibited upon a next move; and
   a warning information outputting unit that outputs the warning information generated by the warning information generating unit.

7. The requirement management device according to claim 1, wherein an input of the request information is inhibited at the times of predetermined desired delivery dates set for each of the requirement rank information.

8. The requirement management device according to claim 7, wherein when the request information input by the request information input unit reaches the time of the predetermined desired delivery date without any change in the requirement rank information, the request information is automatically deleted.

9. The requirement management device according to claim 1, further comprising:
   a possible delivery date computing unit that passes information on computed possible delivery date over to changed request information when not only is the possible delivery date of the request computed based on the request information input by the request information input unit but also the requirement rank information in the request information is changed; and
   a possible delivery date outputting unit that outputs the information on the possible delivery date.

10. The requirement management device according to claim 1, further comprising;
    a possible deliver date computing unit that passes the information on the computed possible delivery date in the request information that has already been input and has the requirement rank other than order over to the request information of the order when not only is the possible delivery date of the request computed based on the request information input by the request information input unit but also a rank to fabricate up to a finished product is input as the requirement rank information in the request information; and
    a possible delivery date information outputting unit that outputs the information on the possible delivery date.

11. The requirement management device according to claim 1, further comprising:
    a cancel information input unit that accepts an input of cancellation of the request information having already been input, the display screen generating unit that generates information on the display screen such that the request information related to the cancellation input by the cancel information input unit is deleted.

12. The requirement management device according to claim 11, further comprising a storage unit that stores therein information on quantity in deleted request information for each of the requirement rank.

13. The requirement management device according to claim 12, wherein when there is request information of the finished product, the quantity related to the information stored by the storage unit is subtracted from the quantity of the request information.

14. A requirement management method for a product that is manufactured through a plurality of steps, comprising:
  accepting an input of request information, at the time of making a request of manufacturing the product, using a computer, the request information including at least information on desired delivery date for the product, information on desired quantity of the product, and requirement rank information that is information on which step among the steps the product is manufactured to;
  displaying a list of all or part of the request information accepted at the accepting is displayed,
  wherein the step among the steps to which the product is manufactured is selected from the group consisting of:
  diffusion,
  wiring,
  assembly, and
  wafer visual test.

15. The requirement management method according to claim 14, further comprising inhibiting an input of the request information at the times of predetermined desired delivery dates set for each of the requirement rank information.

16. The requirement management method according to claim 15, further comprising automatically deleting the request information when the request information accepted at the accepting reaches the time of the predetermined desired delivery date without any change in the requirement rank information.

17. The requirement management method according to claim 14, further comprising:
  computing the possible delivery date of the request based on the request information accepting at the accepting, and passing the possible delivery date computer over to changed request information when the requirement rank information in the request information is changed; and
  outputting the information on the possible delivery date.

18. The requirement management method according to claim 14, further comprising;
  passing the information on the computed possible delivery date in the request information that has already been input and has the requirement rank other than order over to the request information of the order when not only is the possible delivery date of the request computed based on the request information input by the request information input unit but also a rank to fabricate up to a finished product is input as the requirement rank information in the request information; and
  outputting the information on the possible delivery date.

19. A non-transitory computer-readable recording medium that stores therein a computer program for a product that is manufactured through a plurality of steps, the computer program causing a computer to execute:
  accepting an input of request information, at the time of making a request of manufacturing the product, including at least information on desired delivery date for the product, information on desired quantity of the product, and requirement rank information that is information on which step among the steps the product is manufactured to;
  displaying a list of all or part of the request information accepted at the accepting,
  wherein the step among the steps to which the product is manufactured is selected from the group consisting of:
  diffusion,
  wiring,
  assembly, and
  wafer visual test.

* * * * *

UNITED STATES PATENT AND TRADEMARK OFFICE
CERTIFICATE OF CORRECTION

PATENT NO. : 8,355,953 B2
APPLICATION NO. : 11/094640
DATED : January 15, 2013
INVENTOR(S) : Osamu Maruoka It is certified that error appears in the above-identified patent and that said Letters Patent is hereby corrected as shown below:

Title Page Col. 2 (Other Publications); Line 1, Delete "Accountacy," and insert -- Accountancy, --, therefor.

Signed and Sealed this
Fourteenth Day of May, 2013

Teresa Stanek Rea
*Acting Director of the United States Patent and Trademark Office*